(12) United States Patent
Terry

(10) Patent No.: US 10,015,813 B2
(45) Date of Patent: *Jul. 3, 2018

(54) MAC MULTIPLEXING AND TFC SELECTION PROCEDURE FOR ENHANCED UPLINK

(71) Applicant: InterDigital Technology Corporation, Wilmington, DE (US)

(72) Inventor: Stephen E. Terry, Northport, NY (US)

(73) Assignee: INTERDIGITAL TECHNOLOGY CORPORATION, Wilmington, DE (US)

( * ) Notice: Subject to any disclaimer, the term of this patent is extended or adjusted under 35 U.S.C. 154(b) by 7 days.

This patent is subject to a terminal disclaimer.

(21) Appl. No.: 15/235,285

(22) Filed: Aug. 12, 2016

(65) Prior Publication Data

US 2016/0353472 A1    Dec. 1, 2016

Related U.S. Application Data

(63) Continuation of application No. 14/047,228, filed on Oct. 7, 2013, now Pat. No. 9,426,822, which is a
(Continued)

(51) Int. Cl.
H04J 3/24 (2006.01)
H04W 72/12 (2009.01)
(Continued)

(52) U.S. Cl.
CPC ...... H04W 72/1268 (2013.01); H04B 7/2606 (2013.01); H04W 28/065 (2013.01); H04W 72/14 (2013.01)

(58) Field of Classification Search
CPC ........... H04W 28/065; H04W 72/1268; H04W 72/14; H04W 72/1289; H04W 88/08;
(Continued)

(56) References Cited

U.S. PATENT DOCUMENTS 5,280,472 A   1/1994  Gilhousen et al.
6,693,910 B2  2/2004  Chao
(Continued)

FOREIGN PATENT DOCUMENTS

EP  1063818  12/2000
EP  1257140  11/2002
(Continued)

OTHER PUBLICATIONS

3GPP Support Team, "Approved (draft 4) Minutes of the 46bis TSG-RAN WG2 Meeting," R2-051522, TSG-RAN WG2 meeting #47 (May 9-13, 2005).
(Continued)

Primary Examiner — Timothy Pham
(74) Attorney, Agent, or Firm — Volpe and Koenig, P.C.

(57) ABSTRACT

A method and wireless transmit/receive unit (WTRU) for transmitting data over an enhanced uplink (EU) channel is disclosed. The WTRU receives a scheduled grant and at least one non-scheduled grant. The WTRU transmits a medium access control for EU channel (MAC-e) protocol data unit (PDU) over an EU channel. The MAC-e PDU includes multiplexed data. The multiplexed data includes scheduled data. An amount of the multiplexed data is not greater than a size of a largest supported EU transport format combination (E-TFC) size that does not exceed a size based on the received scheduled grant, the received at least one non-scheduled grant, and a power offset. The MAC-e PDU is transmitted based on a selected E-TFC. The selected E-TFC is a smallest E-TFC that supports the multiplexed data of the MAC-e PDU.

14 Claims, 13 Drawing Sheets

Related U.S. Application Data continuation of application No. 12/762,883, filed on Apr. 19, 2010, now Pat. No. 8,553,672, which is a continuation of application No. 11/408,410, filed on Apr. 21, 2006, now Pat. No. 7,701,922.

(60) Provisional application No. 60/683,214, filed on May 20, 2005, provisional application No. 60/676,345, filed on Apr. 29, 2005.

(51) Int. Cl.
*H04B 7/26* (2006.01)
*H04W 28/06* (2009.01)
*H04W 72/14* (2009.01)

(58) Field of Classification Search
CPC ...... H04W 88/12; H04B 7/2606; H04L 47/10; H04L 47/14; H04L 47/365
USPC ........................................................ 370/349
See application file for complete search history.

(56) References Cited

U.S. PATENT DOCUMENTS

| | | |
|---|---|---|
| 6,788,652 B1 | 9/2004 | Hwang |
| 6,813,284 B2 | 11/2004 | Vayanos et al. |
| 6,845,088 B2 | 1/2005 | Terry et al. |
| 6,850,540 B1 | 2/2005 | Peisa et al. |
| 7,227,851 B1 | 6/2007 | Gopalakrishnan et al. |
| 7,397,790 B2 | 7/2008 | Zeira et al. |
| 7,408,895 B2 | 8/2008 | Zhang et al. |
| 7,450,555 B2 | 11/2008 | Kim |
| 7,688,852 B2 | 3/2010 | Bokish et al. |
| 7,706,406 B2 | 4/2010 | Jang |
| 7,746,816 B2 | 6/2010 | Attar et al. |
| 2002/0181436 A1 | 12/2002 | Mueckenheim et al. |
| 2003/0018821 A1 | 1/2003 | Chow et al. |
| 2003/0202485 A1 | 10/2003 | Mansfield |
| 2004/0009786 A1 | 1/2004 | Terry |
| 2004/0085932 A1 | 5/2004 | Jiang |
| 2004/0131026 A1 | 7/2004 | Kim et al. |
| 2004/0162083 A1 | 8/2004 | Chen et al. |
| 2004/0219920 A1 | 11/2004 | Love et al. |
| 2004/0228313 A1 | 11/2004 | Cheng et al. |
| 2005/0047416 A1 | 3/2005 | Heo et al. |
| 2005/0053035 A1 | 3/2005 | Kwak et al. |
| 2005/0169293 A1 | 8/2005 | Zhang et al. |
| 2005/0192011 A1 | 9/2005 | Hong et al. |
| 2005/0249133 A1 | 11/2005 | Terry et al. |
| 2005/0255873 A1 | 11/2005 | Zhang et al. |
| 2005/0265301 A1 | 12/2005 | Heo et al. |
| 2005/0266846 A1 | 12/2005 | Kim |
| 2006/0013268 A1 | 1/2006 | Terry |
| 2006/0023628 A1 | 2/2006 | Uehara et al. |
| 2006/0120404 A1 | 6/2006 | Sebire et al. |
| 2006/0143444 A1 | 6/2006 | Malkamaki et al. |
| 2006/0182065 A1 | 8/2006 | Petrovic et al. |
| 2006/0183428 A1 | 8/2006 | Heo et al. |
| 2007/0073895 A1 | 3/2007 | Sebire et al. |
| 2007/0121542 A1 | 5/2007 | Lohr et al. |
| 2007/0155335 A1 | 7/2007 | Love et al. |
| 2008/0089296 A1 | 4/2008 | Kazmi et al. |
| 2008/0159184 A1 | 7/2008 | Niwano |
| 2008/0254804 A1 | 10/2008 | Lohr et al. |

FOREIGN PATENT DOCUMENTS

| | | |
|---|---|---|
| EP | 1643690 | 4/2006 |
| JP | 2006-191320 | 7/2006 |
| WO | 96/06492 | 2/1996 |
| WO | 99/44315 | 9/1999 |
| WO | 01/63857 | 8/2001 |
| WO | 02/065675 | 8/2002 |
| WO | 04/059869 | 7/2004 |
| WO | 04/093407 | 10/2004 |
| WO | 04/102832 | 11/2004 |
| WO | 05/020473 | 3/2005 |
| WO | 05/022798 | 3/2005 |
| WO | 05/039115 | 4/2005 |
| WO | 06/113829 | 10/2006 |
| WO | 06/118831 | 11/2006 |

OTHER PUBLICATIONS

3GPP, *3rd Generation Partnership Project; Technical Specification Group Radio Access Network; Physical Layer Procedures(FDD) (Release 7)*, 3GPP TS 25.214 V7.1.0 (Jun. 2006), (Jun. 2006).

3GPP, *3rd Generation Partnership Project; Technical Specification Group Radio Access Network; Spreading and Modulation (FDD) (Release 7)*, 3GPP TS 25.213 V7.0.0 (Mar. 2006), (Mar. 2006).

3GPP, *3rd Generation Partnership Project; Technical Specification Group Radio Access Network; Spreading and Modulation (FDD) (Release 7)*, 3GPP TS 25.213 V7.2.0 (May 2007), (May 2007).

3GPP, *3rd Generation Partnership Project; Technical Specification Group Radio Access Network; Physical Layer Procedures(FDD) (Release 7)*, 3GPP TS 25.214 V7.5.0 (May 2007), (May 2007).

3GPP, *3rd Generation Partnership Project; Technical Specification Group Radio Access Network; Medium Access Control(MAC) Protocol Specification(Release 7)*, 3GPP TS 25.321 V7.4.0 (Mar. 2007), (Mar. 2007).

3GPP, *3rdGeneration Partnership Project; Technical Specification Group Radio Access Network; Physical Layer Procedures(FDD) (Release 1999)*, 3GPP TS.25.214 V3.12.0, (Mar. 2003).

3GPP, *3rd Generation Partnership Project; Technical Specification Group Radio Access Network; Physical Layer Proceedures(FDD) (Release 4)*, 3GPP TS 25.214, V4.6.0, (Mar. 2003).

3GPP, *3rd Generation Partnership Project; Technical Specification Group Radio Access Network; Physical Layer Procedures(FDD) (Release 5)*, 3GPP TS 25.214 V5.11.0, (Jun. 2005).

3GPP, *3rd Generation Partnership Project; Technical Specification Group Radio Access Network; Medium Access Control(MAC) Protocol Specification(Release 1999)*, 3GPP TS 25.321 V3.17.0, (Jun. 2004).

3GPP, *3rd Generation Partnership Project; Technical Specification Group Radio Access Network; Medium Access Control(MAC) Protocol Specification(Release 4)*, 3GPP TS 25.321 V4.10.0, (Jun. 2004).

3GPP, *3rd Generation Partnership Project; Technical Specification Group Radio Access Network; Physical Layer Procedures(FDD) (Release 6)*, 3GPP TS 25.214 V6.9.0, (Jun. 2006).

3GPP, *3rd Generation Partnership Project; Technical Specification Group Radio Access Network; Medium Access Control(MAC) Protocol Specification(Release 5)*, 3GPP TS 25.321 V5.12.0, (Sep. 2005).

3GPP, *3rd Generation Partnership Project; Technical Specification Group Radio Access Network; Physical Layer Procedures(FDD) (Release 6)*, 3GPP TS 25.214 V6.11.0, (Dec. 2006).

3GPP, *3rd Generation Partnership Project; Technical Specification Group Radio Access Network; Spreading and Modulation(FDD) (Release 1999)*, 3GPP TS 25.213 V3.9.0, (Dec. 2003).

3GPP, *3rd Generation Partnership Project; Technical Specification Group Radio Access Network; Spreading and Modulation(FDD) (Release 4)*, 3GPP TS 25.213 V4.4.0, (Dec. 2003).

3GPP, *3rd Generation Partnership Project; Technical Specification Group Radio Access Network; Spreading and Modulation(FDD) (Release 5)*, 3GPP TS 25.213 V5.6.0, (Jun. 2005).

3GPP, *3rd Generation Partnership Project; Technical Specification Group Radio Access Network; Spreading and Modulation (FDD) (Release 6)*, TS 25.213 V6.5.0, (Mar. 2006).

3GPP, *3rd Generation Partnership Project; Technical Specification Group Radio Access Network; Medium Access Control(MAC) Protocol Specification (Release 5)*, V5.13.0, (Mar. 2007).

3GPP, *3rd Generation Partnership Project; Technical Specification Group Radio Access Network; Medium Access Control(MAC) Protocol Specification (Release 6)*, 3GPP TS 25.321 V6.9.0, (Jun. 2006).

(56) References Cited

OTHER PUBLICATIONS

3GPP, *3rd Generation Partnership Project; Technical Specification Group Radio Access Network; Medium Access Control(MAC) Protocol Specification (Release 6)* 3GPP TS 25.321 V6.12.0, (Mar. 2007).
3GPP, *3rd Generation Partnership Project; Technical Specification Group Radio Access Network; Medium Access Control(MAC) Protocol Specification (Release 5)*, 3GPP TS 25.321 V5.10.0, (Dec. 2004).
3GPP, *3rd Generation Partnership Project; Technical Specification Group Radio Access Network; Medium Access Control (MAC) Protocol Specification (Release 6)*, 3GPP TS 25.321 V6.4.0, (Mar. 2005).
3GPP, *3rd Generation Partnership Project; Technical Specification Group Radio Access Network; Medium Access Control (MAC)Protocol Specification (Release 6)*, 3GPP TS 25.321 V6.8.0, (Mar. 2006).
3GPP, *3rd Generation Partnership Project; Technical Specification Group Radio Access Network; Physical Layer Procedures (FDD) (Release 7)*, 3GPP TS 25.214 V7.0.0, (Mar. 2006).
3GPP, *3rd Generation Partnership Project; Technical Specification Group Radio Access Network; Physical Layer Procedures (FDD) (Release 6)*, 3GPP TS 25.214 V6.5.0, (Mar. 2005).
3GPP, *3rd Generation Partnership Project; Technical Specification Group Radio Access Network; Spreading and Modulation (FDD) (Release 5)*, 3GPP TS 25.213 V6.2.0, (Mar. 2005).
3GPP, *3rd Generation Partnership Project; Technical Specification Group Radio Access Network; Spreading and Modulation (FDD) (Release 5)*, 3GPP TS 25.213 V5.5.0, (Dec. 2003).
3GPP, *3rd Generation Partnership Project; Technical Specification Group Radio Access Network; Physical Layer Procedures (FDD) (Release 5)*, 3GPP TS 25.214 V5.10.0, (Dec. 2004).
3GPP, *3rd Generation Partnership Project; Technical Specification Group Radio Access Network; Physical Layer Procedures (FDD) (Release 6)*, 3GPP TS 25.214 V6.8.0, (Mar. 2006).
3GPP, *3rd Generation Partnership Project; Technical Specification Group Radio Access Network; FDD Enhanced Uplink; Overall Description; Stage 2 (Release 6)*, 3GPP TS 25.309 V6.2.0, (Mar. 2005).
3GPP, *3rd Generation Partnership Project; Technical Specification Group Radio Access Network; FDD Enhanced Uplink; Overall Description; Stage 2 (Release 6)*, 3GPP TS 25.309 V6.6.0, (Mar. 2006).
3GPP, *3rd Generation Partnership Project; Technical Specification Group Radio Access Network; Medium Access Control (MAC) protocol specification (Release 7)*, 3GPP TS 25.321 V7.0.0 (Mar. 2006).
3GPP, *3rd Generation Partnership Project; Technical Specification Group Radio Access Network; Services provided by the physical layer (Release 7)*,3GPP TS 25.302 V7.0.0 (Mar. 2006).
3GPP, *3rd Generation Partnership Project; Technical Specification Group Radio Access Network; Medium Access Control (MAC) Protocol Specification (Release 7)*, 3GPP TS 25.321 V7.1.0 (Jun. 2006), (Jun. 2006).
3GPP, *3rd Generation Partnership Project; Technical Specification Group Radio Access Network; Services provided by the physical layer (Release 1999)*, 3GPP TS 25.302 V3.16.0 (Sep. 2003).
3GPP, *3rd Generation Partnership Project; Technical Specification Group Radio Access Network; Services provided by the physical layer (Release 4)*, 3GPP TS 25.302 V4.8.0 (Sep. 2003).
3GPP, *3rd Generation Partnership Project; Technical Specification Group Radio Access Network; Services provided by the physical layer (Release 5)*, 3GPP TS 25.302 V5.7.0 (Dec. 2003).
3GPP, *3rd Generation Partnership Project; Technical Specification Group Radio Access Network; Services provided by the physical layer (Release 5)*, 3GPP TS 25.302 V5.9.0 (Sep. 2005).
3GPP, *3rd Generation Partnership Project; Technical Specification Group Radio Access Network; Services provided by the physical layer (Release 6)*, 3GPP TS 25.302 V6.3.0 (Mar. 2005).
3GPP, *3rd Generation Partnership Project; Technical Specification Group Radio Access Network; Services provided by the physical layer (Release 6)*, 3GPP TS 25.302 V6.6.0 (Mar. 2006).
3GPP, *3rd Generation Partnership Project; Technical Specification Group Radio Access Network; Physical channels and mapping of transport channels onto physical channels(FDD) (Release 1999)*, 3GPP TS 25.211.V3.12.0 (Sep. 2002).
3GPP, *3rd Generation Partnership Project; Technical Specification Group Radio Access Network; Physical channels and mapping of transport channels onto physical channels(FDD) (Release 4)*, 3GPP TS 25.211.V4.6.0 (Sep. 2002).
3GPP, *3rd Generation Partnership Project; Technical Specification Group Radio Access Network; Physical channels and mapping of transport channels onto physical channels(FDD) (Release 5)*, 3GPP TS 25.211.V5.6.0 (Sep. 2004).
3GPP, *3rd Generation Partnership Project; Technical Specification Group Radio Access Network; Physical channels and mapping of transport channels onto physical channels(FDD) (Release 5)*, 3GPP TS 25.211.V5.8.0 (Dec. 2005).
3GPP, *3rd Generation Partnership Project; Technical Specification Group Radio Access Network; Physical channels and mapping of transport channels onto physical channels(FDD) (Release 6)*, 3GPP TS 25.211.V6.4.0 (Mar. 2005).
3GPP, *3rd Generation Partnership Project; Technical Specification Group Radio Access Network; Physical channels and mapping of transport channels onto physical channels(FDD) (Release 6)*, 3GPP TS 25.211.V6.7.0 (Dec. 2005).
3GPP, *3rd Generation Partnership Project; Technical Specification Group Radio Access Network; Physical channels and mapping of transport channels onto physical channels(FDD) (Release 7)*, 3GPP TS 25.211.V7.0.0 (Mar. 2006).
3GPP, *3rd Generation Partnership Project; Technical Specification Group Radio Access Network; Requirements for support of radio resource management(FDD) (Release 99)*, 3GPP TS 25.133 V3.20. 0.(Mar. 2005).
3GPP, *3rd Generation Partnership Project; Technical Specification Group Radio Access Network; Requirements for support of radio resource management(FDD)* (Release 99), 3GPP TS 25.133 V3.22. 0.(Sep. 2005).
3GPP, *3rd Generation Partnership Project; Technical Specification Group Radio Access Network; Requirements for support of radio resource management (FDD) (Release 4)*, 3GPP TS 25.133 V4.14. 0.(Mar. 2005).
3GPP, *3rd Generation Partnership Project; Technical Specification Group Radio Access Network; Requirements for support of radio resource management(FDD) (Release 4)*, 3GPP TS 25.133 V4.17. 0.(Mar. 2006).
3GPP, *3rd Generation Partnership Project; Technical Specification Group Radio Access Network; Requirements for support of radio resource management(FDD) (Release 5)*, 3GPP TS 25.133 V5.14. 0.(Mar. 2005).
3GPP, *3rd Generation Partnership Project; Technical Specification Group Radio Access Network; Requirements for support of radio resource management (FDD) (Release 5)*, 3GPP TS 25.133 V5.17. 0.(Dec. 2005).
3GPP, *3rd Generation Partnership Project; Technical Specification Group Radio Access Network; Requirements for support of radio resource management(FDD)* (Release 6), 3GPP TS 25.133 V6.9.0 (Mar. 2005).
3GPP, *3rd Generation Partnership Project; Technical Specification Group Radio Access Network; Requirements for support of radio resource management(FDD) (Release 6)*, 3GPP TS 25.133 V6.13. 0.(Mar. 2006).
3GPP, *3rd Generation Partnership Project; Technical Specification Group Radio Access Network; Requirements for support of radio resource management(FDD) (Release 7)*, 3GPP TS 25.133 V7.3.0 (Mar. 2006).
3rd Generation Partnership Project; "Technical Specification Group Radio Access Network; Multiplexing and channel coding (FDD) (Release 1999)," 3GPP TS 25.212 V3.11.0 (Sep. 2002).
3rd Generation Partnership Project; "Technical Specification Group Radio Access Network; Multiplexing and channel coding (FDD) (Release 4)," 3GPP TS 25.212 V4.6.0 (Sep. 2002).

(56) References Cited

OTHER PUBLICATIONS

3rd Generation Partnership Project; "Technical Specification Group Radio Access Network; Multiplexing and channel coding (FDD) (Release 5)," 3GPP TS 25.212 V5.9.0 (Jun. 2004).

3rd Generation Partnership Project; "Technical Specification Group Radio Access Network; Multiplexing and channel coding (FDD) (Release 5)," 3GPP TS 25.212 V5.10.0 (Jun. 2005).

3rd Generation Partnership Project; "Technical Specification Group Radio Access Network; Multiplexing and channel coding (FDD) (Release 6)," 3GPP TS 25.212 V6.4.0 (Mar. 2005).

3rd Generation Partnership Project; "Technical Specification Group Radio Access Network; Multiplexing and channel coding (FDD) (Release 6)," 3GPP TS 25.212 V6.7.0 (Dec. 2005).

3rd Generation Partnership Project; "Technical Specification Group Radio Access Network; Multiplexing and channel coding (FDD) (Release 7)," 3GPP TS 25.212 V7.0.0 (Mar. 2006).

Ericsson et al., "Handling of Non-Scheduled Grants," R2-050451, 3GPP TSG-RAN WG2 meeting #46 (Feb. 14-18, 2005).

Ericsson et al., "Pseudo Code for E-TFC Selection," 3GPP TSG-RAN WG2 Meeting #46bis, R2-050862 (Apr. 4-8, 2005).

Ericsson, "Clarification on Calculation of 'Scheduled Grant Payload,'" 3GPP TSG-WG2 Meeting #58, R2071850, Kobe, Japan, (May 7, 2007).

Ericsson, "Clarification on calculation of 'Scheduled Grant Payload'," 3GPP TSG-RAN WG2 Meeting #58, R2072328, Kobe, Japan, (May 7, 2007).

Ericsson, "Correction of E-TFC Selection Following Inclusion of E-TFC Restriction in TS25.309—Update," R2051119, 3GPP TSG-RAN WG2 #46bis (Apr. 4-8, 2005).

InterDigital et al., "Clarifications and Corrections of E-TFC Selection," R2-052605, 3GPP TSG-RAN WG2 Meeting #48bis (Oct. 10-14, 2005).

InterDigital, "EU MAC Multiplexing and TFC Selection," R2-051253, TSG-RAN Working Group 2, Meeting #47 (May 9-13, 2005).

Lucent, "Scheduled and Autonomous Mode Operation for the Enhanced Uplink," 3GPP TSG RAN WG1 #31, R1-03-0284, Tokyo, Japan (Feb. 17-20, 2003).

Mitsubishi Electric, "On E-TFC selection scheme," 3GPP RAN4 Ad Hoc meeting on MBMS/EDCH, R4AH-05007 (Apr. 4-6, 2005).

Motorola, "Design Considerations for Enhanced Uplink Dedicated Channel," R1-02-1350, 3GPPRAN1#29 (Nov. 5-8, 2002).

Motorola, "E-TFC Selection and Transmit power", 3GPP RAN4#34, R4-050215, Scottsdale, AZ, USA, (Feb. 14-18, 2005).

Motorola, "RG based scheduling Mode," 3GPP TSG RAN WG2 #46 Bis, R2-050824, Beijing, China (Apr. 4-8 2005).

Nokia, "MAC multiplexing and numbering", 3GPP TSG-RAN WG2 AdHoc, R2-041358, Cannes, France, (Jun. 21-24, 2004).

Panasonic, "Comparison of the Scheduling Points on Coding Chain," R1-041081, 3GPP TSG RAN1#38bis, (Sep. 20-24, 2004).

Parkvall et al., "WCDMA Enhanced Uplink—Principles and Basic Operation", 2005 IEEE 61$^{st}$ Vehicular Technology Conference, VTC 2005—Spring. vol. 3, No. 30, pp. 1411-1415, (May 30-Jun. 1, 2005).

Qualcomm, "E-DCH Transport Block Size Tables", 3GPP TSG-RAN WG2 meeting #46bis, R2-050968, Beijing, China, (Apr. 4-8, 2005).

Qualcomm, "Non-scheduling grant proposal," 3GPP TSG-RAN WG2 meeting #46, R2-050628 (Feb. 14-18, 2005).

Qualcomm, "TB Size Sets," R2-050456, 3GPP TSG-RAN WG2 meeting #46 (Feb. 14-18, 2005).

Qualcomm, "TFC Selection Scheme details," 3GPP TSG-RAN WG2 meeting #46, R2-050457, Scottsdale, AZ, USA, (Feb. 14, 2005).

Qualcomm, "Transmission Rate and Power Setting Terminology and Handling," R2-050455, 3GPP TSG-RAN WG2 meeting #46, (Feb. 14-18, 2005).

Rohde & Schwarz GMBH & CO. KG, *High Speed Uplink Packet Access(HSUPA) White Paper*, Application Note 1MA94, (Jan. 2006).

Third Generation Partnership Project, Universal Mobile Telecommunications System (UMTS); Medium Access Control (MAC) Protocol Specification (3GPP TS 25.321 Version 7.1.0 Release 7), ETSI TS 125 321 V7.1.0 (Jun. 2006).

Zhang et al, "Studies on a New Qos-based TFC Selection Algorithms in HSUPA Systems," Guangdong Communication Technology (2005).

Zhang, "Studies on TFC Selection Algorithms in HSUPA Systems, A Dissertation Submitted to Southeast University for the Academic Degree of Master of Engineering," Southeast University, China (Mar. 2006).

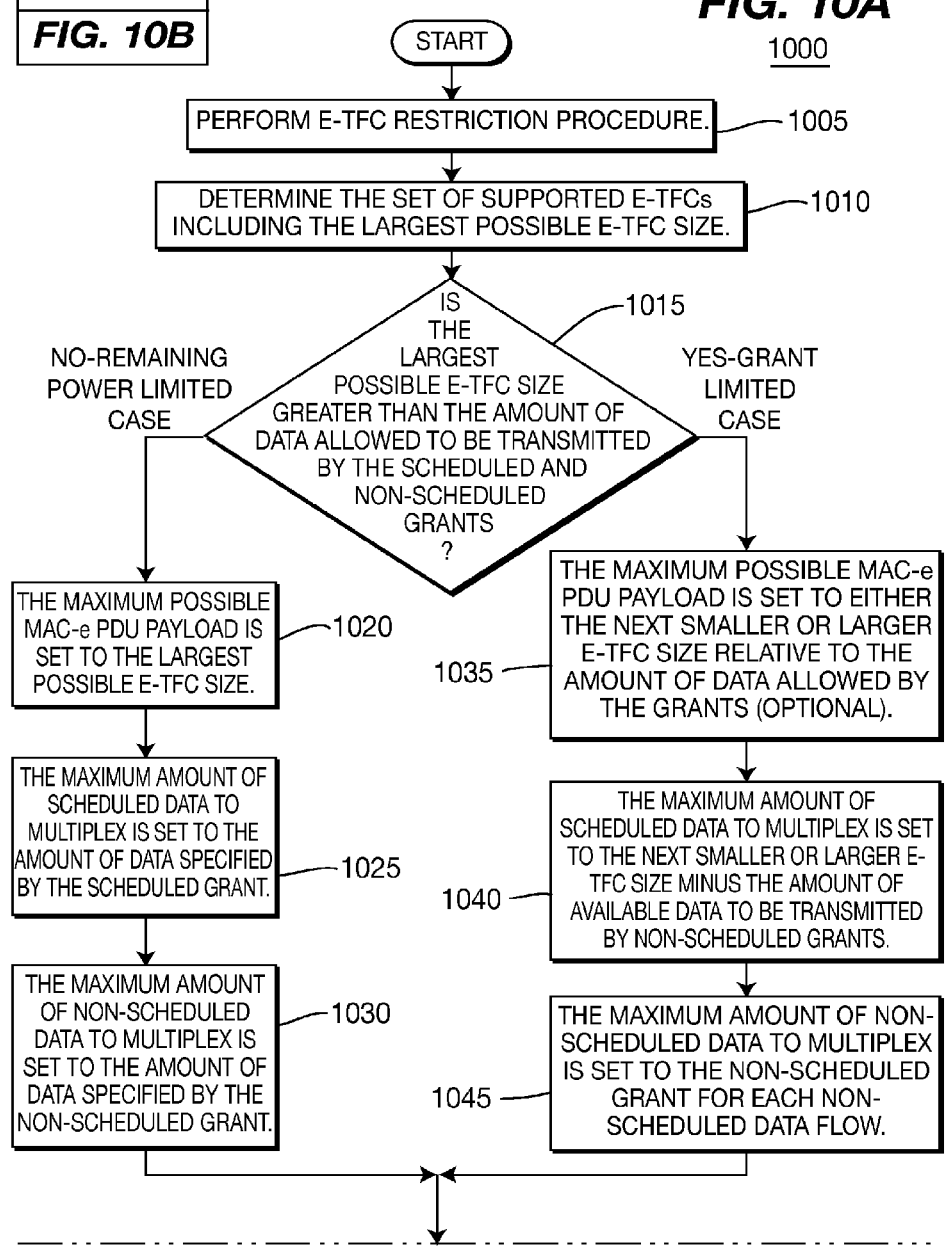

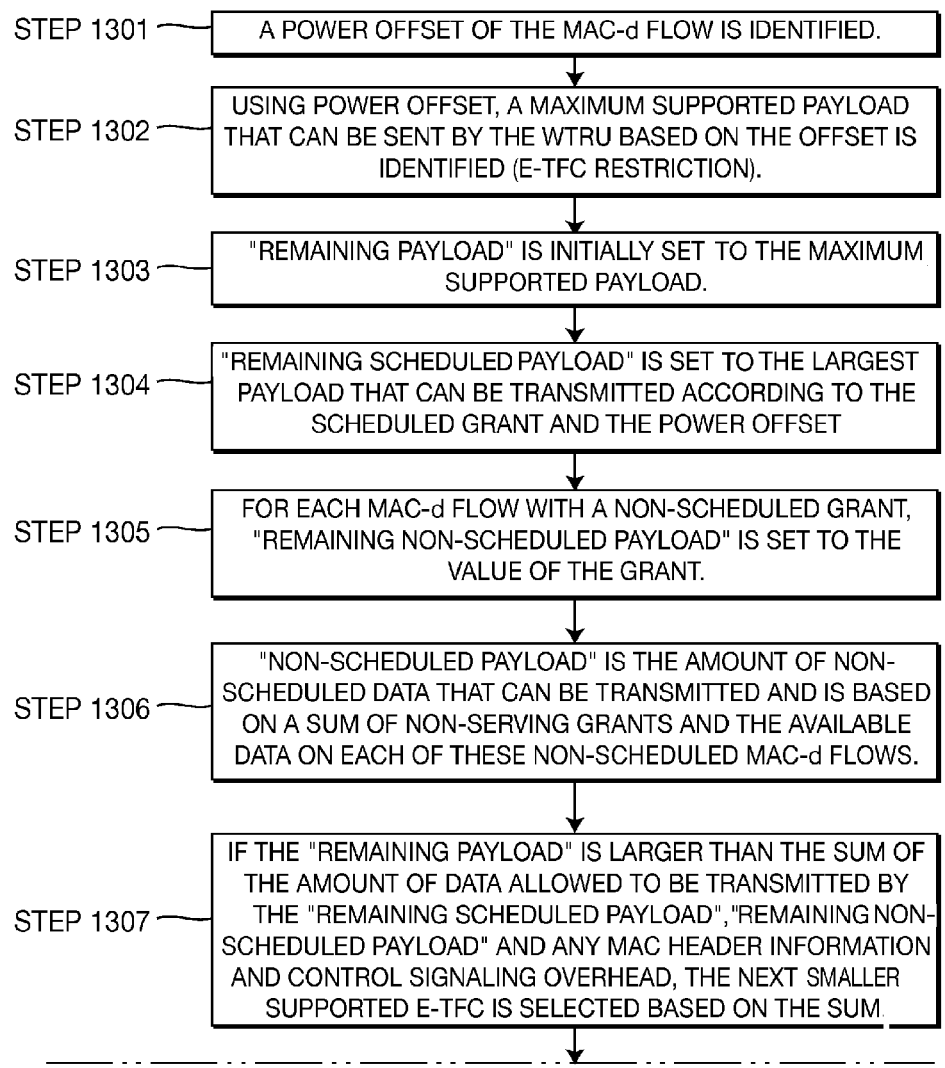

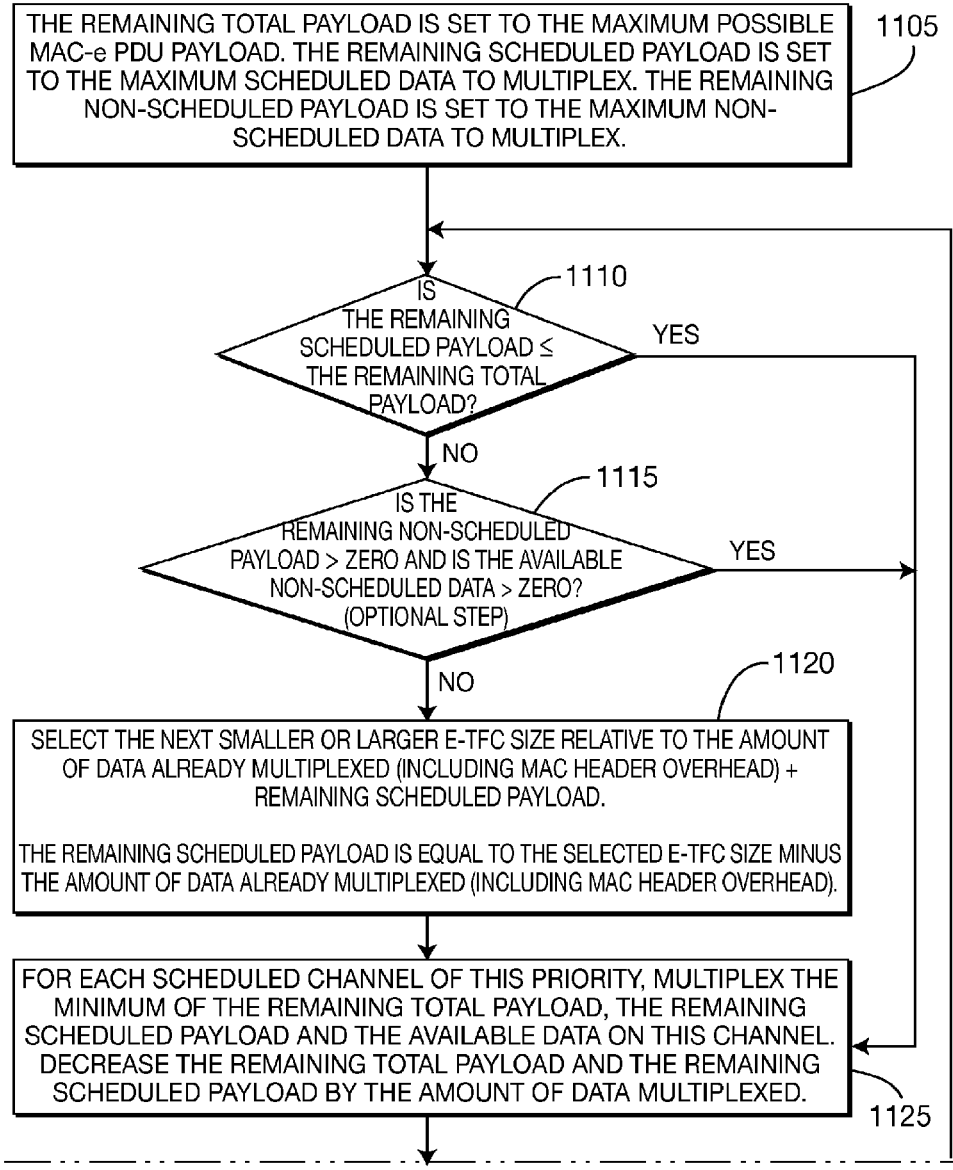

MAC MULTIPLEXING AND TFC SELECTION PROCEDURE FOR ENHANCED UPLINK

CROSS REFERENCE TO RELATED APPLICATIONS

This application is a continuation of U.S. patent application Ser. No. 14/047,228 filed Oct. 7, 2013, which is a continuation of U.S. patent application Ser. No. 12/762,883 filed Apr. 19, 2010, which issued as U.S. Pat. No. 8,553,672 on Oct. 8, 2013, which is a continuation of U.S. patent application Ser. No. 11/408,410 filed Apr. 21, 2006, which issued as U.S. Pat. No. 7,701,922 on Apr. 20, 2010, which claims the benefit of U.S. Provisional Application No. 60/676,345 filed Apr. 29, 2005 and U.S. Provisional Application No. 60/683,214 filed May 20, 2005, all of which are incorporated by reference as if fully set forth.

FIELD OF INVENTION

The present invention is related to wireless communications. More particularly, the present invention is related to enhanced uplink (EU) transmission.

BACKGROUND

In a Third Generation (3G) cellular system, such as the system 100 shown in FIG. 1, EU provides improvements to uplink (UL) data throughput and transmission latency. The system 100 includes a Node-B 102, an RNC 104 and a wireless transmit/receive unit (WTRU) 106.

As shown in FIG. 2, the WTRU 106 includes a protocol architecture 200 which includes higher layers 202 and an EU medium access control (MAC), (MAC-e) 206, used to support EU operation between a dedicated channel MAC, (MAC-d) 204, and a physical layer (PHY) 208. The MAC-e 206 receives data for EU transmission from channels known as MAC-d flows. The MAC-e 206 is responsible for multiplexing data from MAC-d flows into MAC-e protocol data units (PDUs) for transmission, and for selecting proper EU transport format combinations (E-TFCs) for EU transmissions.

To allow for EU transmissions, physical resource grants are allocated to the WTRU 106 by the Node-B 102 and the RNC 104. WTRU UL data channels that require fast dynamic channel allocations are provided with fast "scheduled" grants provided by the Node-B 102, and channels that require continuous allocations are provided with "non-scheduled" grants by the RNC 104. The MAC-d flows provide data for UL transmission to the MAC-e 206. The MAC-d flows are either configured as scheduled or non-scheduled MAC-d flows.

A "serving grant" is the grant for scheduled data. A "non-scheduled grant" is the grant for non-scheduled data. The serving grant is the power ratio that is converted to a corresponding amount of scheduled data that can be multiplexed, thus resulting in the scheduled data grant.

The RNC 104 configures non-scheduled grants for each MAC-d flow using radio resource control (RRC) procedures. Multiple non-scheduled MAC-d flows can be configured simultaneously in the WTRU 106. This configuration is typically performed upon radio access bearer (RAB) establishment, but may be reconfigured when necessary. The non-scheduled grant for each MAC-d flow specifies the number of bits that can be multiplexed into a MAC-e PDU. The WTRU 106 is then allowed to transmit non-scheduled transmissions up to the sum of non-scheduled grants, if multiplexed in the same transmission time interval (TTI).

Based on scheduling information sent in rate requests from the WTRU 106, the Node-B 102 dynamically generates scheduling grants for scheduled MAC-d flows. Signaling between the WTRU 106 and the Node-B 102 is performed by fast MAC layer signaling. The scheduling grant generated by the Node-B 102 specifies the maximum allowed EU dedicated physical data channel (E-DPDCH)/dedicated physical control channel (DPCCH) power ratio. The WTRU 106 uses this power ratio and other configured parameters to determine the maximum number of bits that can be multiplexed from all scheduled MAC-d flows into a MAC-e PDU.

Scheduled grants are "on top of" and mutually exclusive of non-scheduled grants. Scheduled MAC-d flows can not transmit data using a non-scheduled grant, and non-scheduled MAC-d flows can not transmit data using a scheduled grant.

The EU transport format combination set (E-TFCS) comprising all possible E-TFCs is known to the WTRU 106. For each EU transmission, an E-TFC is selected from a set of supported E-TFCs within the E-TFCS.

Since other UL channels take precedence over EU transmissions, the power available for EU data transmission on E-DPDCH is the remaining power after the power required for DPCCH, dedicated physical data channel (DPDCH), high speed dedicated physical control channel (HS-DPCCH) and EU dedicated physical control channel (E-DPCCH) is taken into account. Based on the remaining transmit power for EU transmission, blocked or supported states of E-TFCs within the E-TFCS are continuously determined by the WTRU 106.

Each E-TFC corresponds to a number of MAC layer data bits that can be transmitted in an EU transmission time interval (TTI). Since there is only one MAC-e PDU per E-TFC that is transmitted in each EU TTI, the largest E-TFC that is supported by the remaining power defines the maximum amount of data, (i.e., the number of bits), that can be transmitted within a MAC-e PDU.

Multiple scheduled and/or non-scheduled MAC-d flows may be multiplexed within each MAC-e PDU based on absolute priority. The amount of data multiplexed from each MAC-d flow is the minimum of the current scheduled or non-scheduled grant, the available MAC-e PDU payload from the largest supported TFC, and the data available for transmission on the MAC-d flow.

Within the supported E-TFCs, the WTRU 106 selects the smallest E-TFC that maximizes the transmission of data according to the scheduled and non-scheduled grants. When scheduled and non-scheduled grants are fully utilized, available MAC-e PDU payload is fully utilized, or the WTRU 106 has no more data available and allowed to be transmitted, MAC-e PDUs are padded to match the next largest E-TFC size. This multiplexed MAC-e PDU and corresponding TFC are passed to the physical layer for transmission.

The serving and non-serving grants specify the maximum amount of data that can be multiplexed from specific MAC-d flows into MAC-e PDUs each EU TTI. Since the scheduled grants are based on the E-DPDCH/DPCCH ratio, the number of data bits allowed to be multiplexed per MAC-e PDU can not be explicitly controlled only to allow certain sizes which match the limited number of data sizes of the supported E-TFCs within the E-TFCS.

The remaining transmit power for EU data transmission determines the list of supported E-TFCs within the E-TFCS.

Since the supported E-TFCs are determined from a limited number of E-TFCs in the TFCS, the granularity of allowed MAC-e PDU sizes will not allow for all possible MAC-d flow and MAC-e header combinations. Therefore, since the amount of MAC-d flow data allowed by the grants to be multiplexed into a MAC-e PDU will frequently not match the size of one of the supported E-TFCs, padding will be applied to the MAC-e PDU to match the smallest possible E-TFC size within the list of supported E-TFCs.

It is expected that when EU cells are operating at maximum capacity the MAC-e PDU multiplexing is frequently limited by the serving and non-serving grants, and not limited by the largest supported E-TFC or the WTRU EU data available for transmission. In this case, depending on the granularity of specified E-TFCs within the E-TFCS, padding required to match the selected E-TFC may exceed the multiplexing block size of MAC-d flow data including associated MAC-e header information. In this case, the effective data rate is unnecessarily reduced from what is allowed by the selected E-TFC and the physical resources required for its transmission.

FIG. 3 illustrates a MAC-e PDU 300. A MAC-e PDU header 302 and MAC-d flow data 304 allowed by scheduling and non-scheduling grants are multiplexed. Among a set of supported E-TFCs, the WTRU 106 selects the smallest E-TFC from a list of supported E-TFCs that is larger than MAC-e PDU header 302 and MAC-d flow data 304. Padding 306 is then applied to the MAC-e PDU to match the selected E-TFC size. However, the padding 306 may exceed the multiplexing block size of MAC-d flow data. In this case, physical resources used in the EU transmission are under utilized and the effective WTRU data rate is unnecessarily reduced. Accordingly, it is desirable to have alternate approaches to multiplexing EU data.

SUMMARY

The present invention is related to quantizing the amount of multiplexed data allowed by grants to closely match a selected E-TFC transport block size is disclosed. The amount of scheduled and/or non-scheduled data allowed to be transmitted is either increased or decreased relative to the grants so that the amount of data multiplexed into a MAC-e PDU more closely matches the selected E-TFC transport block size.

When the amount of scheduled data is adjusted to more closely match a selected E-TFC, the maximum amount of scheduled data to multiplex, the scheduled payload to transmit, is determined by the sum of the scheduled and non-scheduled data available to be transmitted and allowed by the grants quantized to the next larger or smaller E-TFC size, minus the amount of available to be transmitted non-scheduled data that is allowed by the non-scheduled grants.

This quantization is applied when multiplexing is grant limited, and not limited by the maximum E-TFC size resulting from E-TFC restriction or limited by E-DCH data available for transmission.

BRIEF DESCRIPTION OF THE DRAWINGS

FIGS. 10A and 10B, taken together, is a flow diagram of an exemplary procedure for multiplexing in accordance with another embodiment.

FIGS. 11A and 11B is a flow diagram of a process for multiplexing MAC-d flows into MAC-e PDUs.

FIGS. 13A and 13B, taken together, is a flow diagram of a multiplexing procedure in accordance with another embodiment.

DETAILED DESCRIPTION OF THE PREFERRED EMBODIMENTS

Hereafter, the terminology "WTRU" includes but is not limited to a user equipment (UE), a mobile station, a fixed or mobile subscriber unit, a pager, or any other type of device capable of operating in a wireless environment. When referred to hereafter, the terminology "Node-B" includes but is not limited to a base station, a site controller, an access point or any other type of interfacing device in a wireless environment. One potential system where the WTRU and Node-B are used is the wideband code division multiple access (W-CDMA) frequency division duplex (FDD) communication system, although these embodiments can be applied to other communication systems.

The features of the present invention may be incorporated into an integrated circuit (IC) or be configured in a circuit comprising a multitude of interconnecting components.

The following modifications to MAC-e PDU multiplexing logic are proposed for more efficient data multiplexing and improved radio resource utilization for the cases where MAC-e PDU multiplexing is limited by scheduled and/or non-scheduled grants, and not limited by the largest supported E-TFC or available EU data for transmission. The amount of data allowed to be multiplexed from MAC-d flows into MAC-e PDUs according to the scheduled and non-scheduled grants is either increased or decreased to more closely match the next smaller or next larger E-TFC size relative to the amount of data allowed to be multiplexed by the scheduled and non-scheduled grants.

Figure 1:
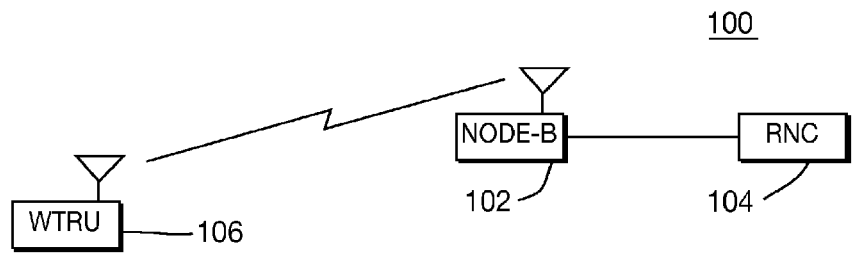
FIG. 1 shows a 3G cellular system.
Figure 2:
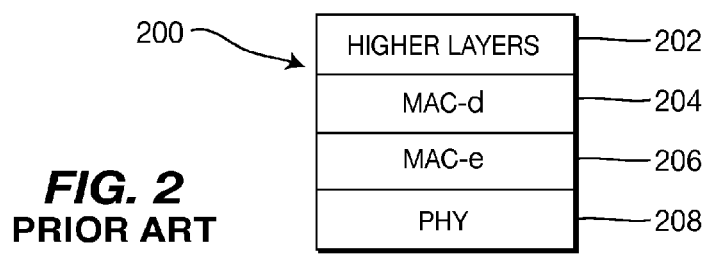
FIG. 2 shows an EU protocol architecture in a WTRU.
Figure 3:
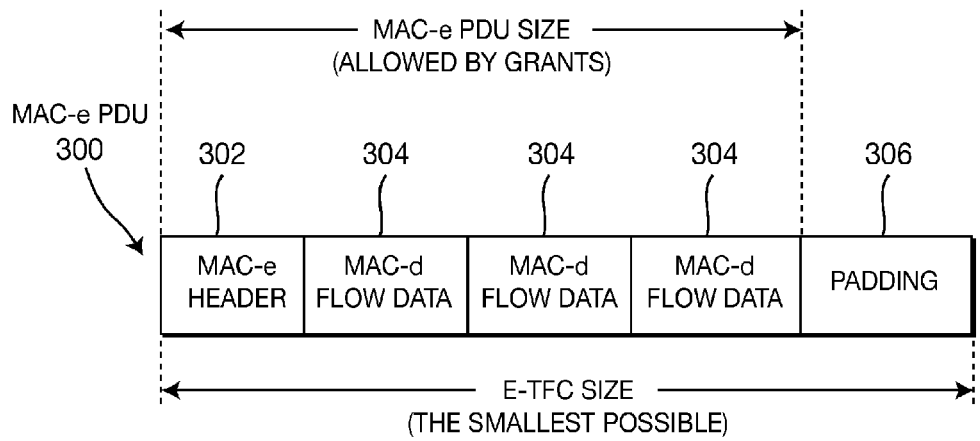
FIG. 3 illustrates a MAC-e PDU generation.
Figure 4:
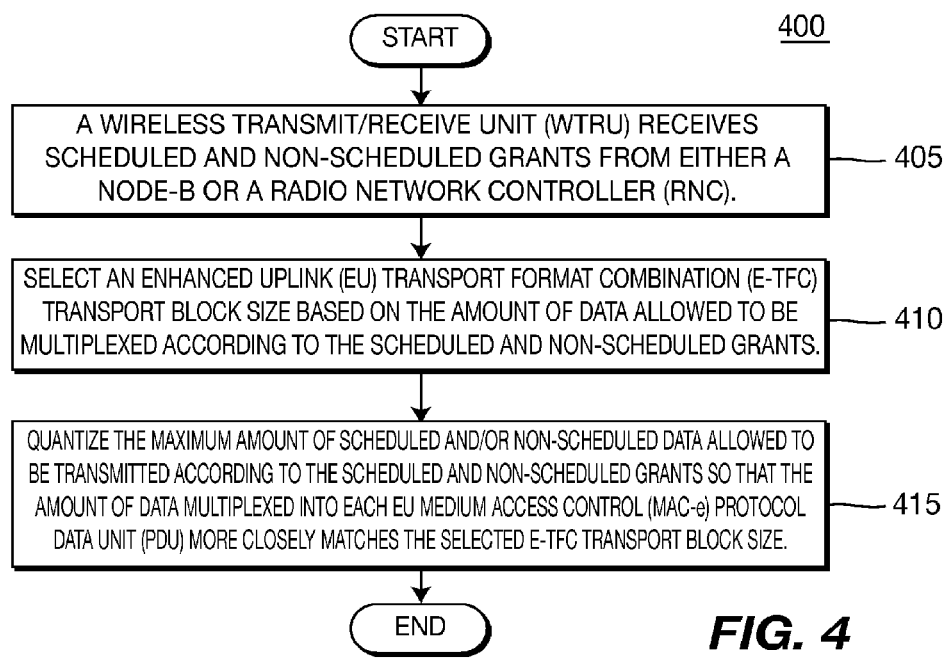
FIG. 4 is a flow diagram of a process for generating MAC-e PDUs by quantizing the maximum amount of scheduled and/or non-scheduled data allowed to be transmitted in accordance with a first embodiment.

FIG. 4 is a flow diagram of a process 400 for generating MAC-e PDUs in accordance with an embodiment. In step 405, a WTRU receives a scheduled data grant from a Node-B and/or non-scheduled grants from an RNC. In step 410, an E-TFC transport block size is selected based on the amount of data allowed to be multiplexed according to the scheduled and non-scheduled grants. In step 415, the maximum amount of scheduled and/or non-scheduled data allowed to be transmitted according to the scheduled and non-scheduled grants is quantized so that the amount of data multiplexed into each MAC-e PDU more closely matches the selected E-TFC transport block size.

Figure 5:
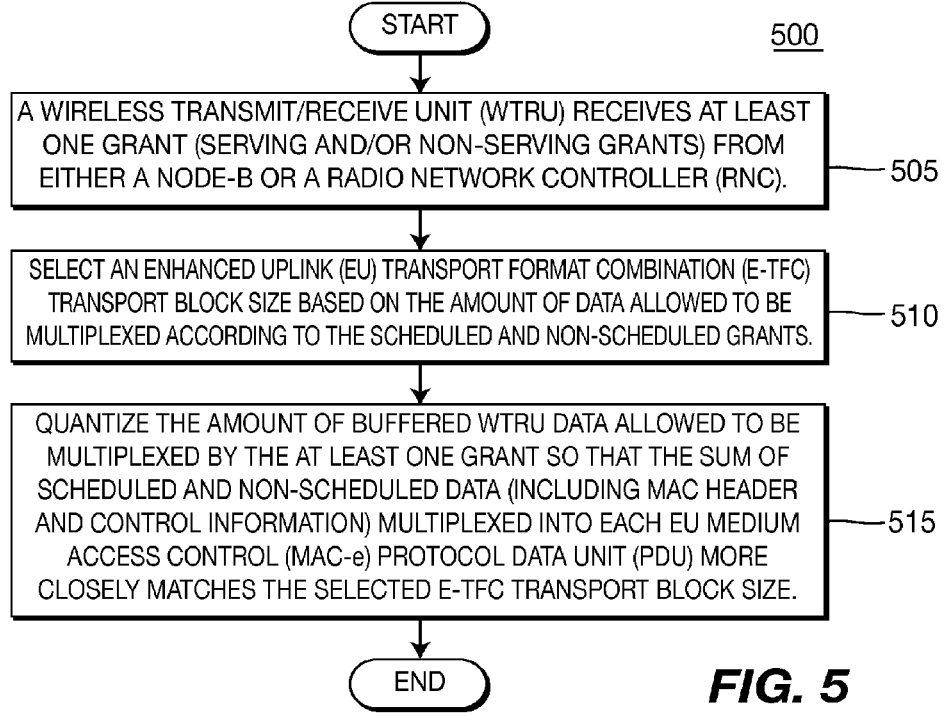
FIG. 5 is a block diagram of a process for generating MAC-e PDUs by quantizing the maximum amount of non-scheduled data allowed to be multiplexed in accordance with another embodiment.

FIG. 5 is a flow diagram of a process 500 for generating MAC-e PDUs in accordance with another embodiment. In step 505, a WTRU receives a scheduled data grant from a Node-B and/or non-scheduled grants from an RNC. In step 510, an E-TFC transport block size is selected based on the amount of data allowed to be multiplexed according to the scheduled and non-scheduled grants. In step 515, the amount of buffered WTRU data allowed to be multiplexed by the at least one grant is quantized so that the sum of scheduled and non-scheduled data (including MAC header and control information) multiplexed into each EU MAC-e PDU more closely matches the selected E-TFC transport block size.

Alternatively, in a separate embodiment, granularity of E-TFC sizes is defined within the E-TFCS so that the difference between E-TFC sizes is not greater than one MAC-d PDU and the associated MAC-e header overhead. E-TFCs are defined for each possible MAC-d flow multiplexing combination and associated MAC-e header overhead. By optimizing the E-TFCS in this way, the padding required after MAC-d flow data is multiplexed according to the scheduled and non-scheduled grants will not exceed the size of possible MAC-d flow multiplexing block sizes.

Figure 6:
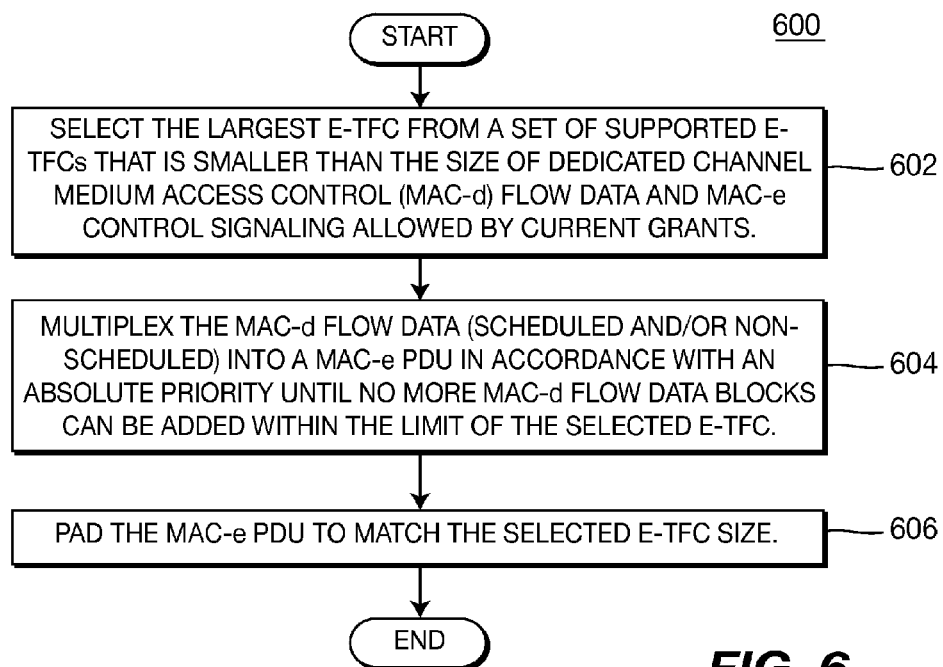
FIG. 6 is a flow diagram of a process for generating a MAC-e PDU by reducing multiplexed data in accordance with another embodiment.

FIG. 6 is a flow diagram of a process 600 for generating a MAC-e PDU in accordance with another embodiment. A largest E-TFC is selected from a set of supported E-TFCs that is smaller than the size of MAC-d flow data and MAC-e control signaling allowed by current grants 602. As a result, the selected E-TFC permits a decreased amount of data to be multiplexed onto the MAC-e PDU relative to the amount allowed by the grants, to more closely match the largest E-TFC size that is smaller than the amount required by scheduled and non-scheduled grants. The MAC-d flow data (scheduled and/or non scheduled) is multiplexed into a MAC-e PDU in accordance with an absolute priority until no more MAC-d flow data blocks can be added within the limit of the selected E-TFC 604. The MAC-e PDU is padded to match the selected E-TFC size 606.

Figure 7:
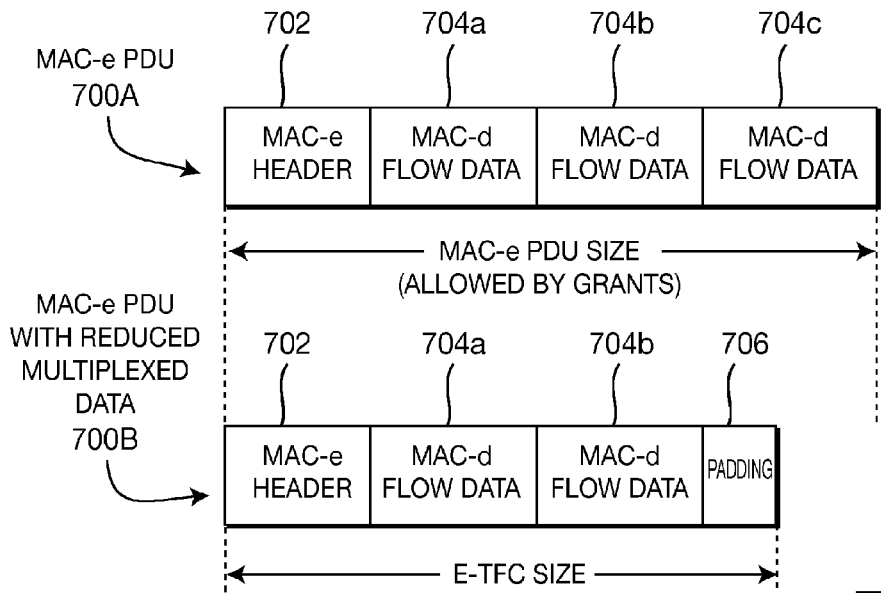
FIG. 7 illustrates MAC-e PDU generation using the process of FIG. 6.

FIG. 7 illustrates the decreased MAC-e PDU 700B size that more closely matches a selected E-TFC size in accordance with the embodiment of FIG. 6. A MAC-e PDU header 702 and MAC-d flow data blocks 704a-704c are supported by the current scheduled and non-scheduled grants. Referring to FIGS. 6 and 7, the largest E-TFC that is smaller than the size of MAC-d flow data allowed by current grants is selected from the set of supported E-TFCs (step 602). MAC-d flow data blocks, (in this example, the two MAC-d flow data blocks, 704a, 704b), are multiplexed into the MAC-e PDU 700B in accordance with an absolute priority until no more MAC-d flow data blocks can be added within the limit of the selected E-TFC size (step 604). MAC-d flow data block 704c is not multiplexed since it will exceed the limit of the selected E-TFC. Preferably, only the amount of multiplexed scheduled data is adjusted to more closely match the selected E-TFC size. Padding 706 is then applied to the MAC-e PDU 700B to match the selected E-TFC size (step 606). One technique for the padding is accomplished implicitly by insertion of an end-of-data indicator in the MAC-e PDU header information.

Figure 8A:
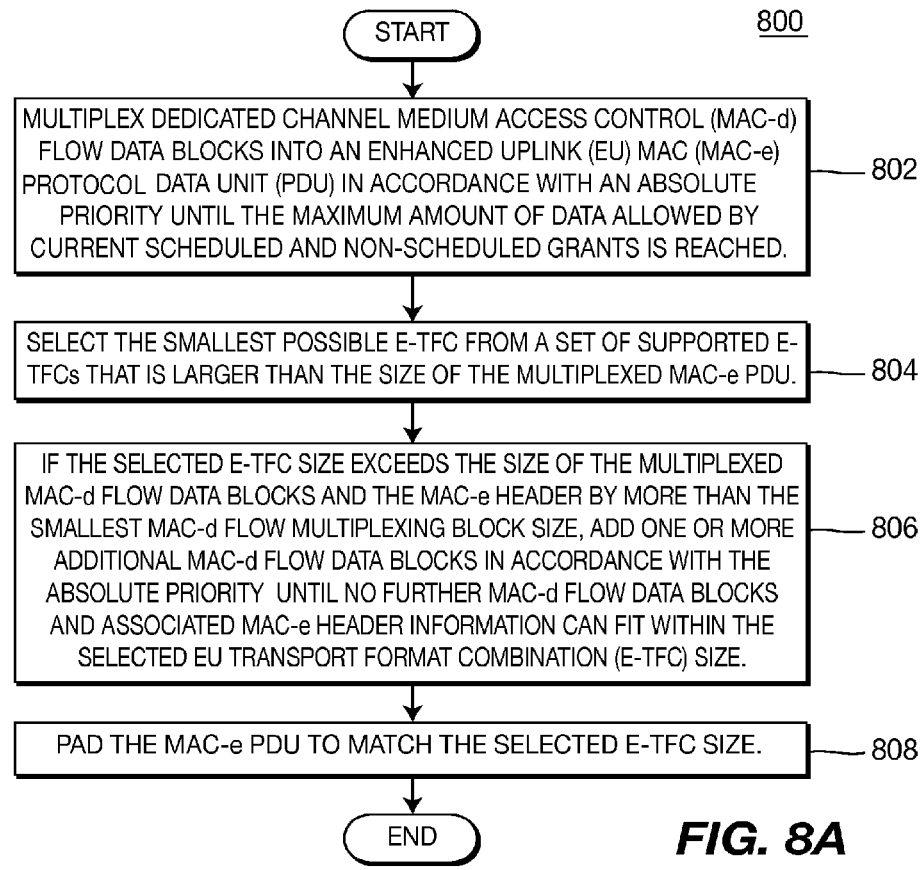
FIG. 8A is a flow diagram of a process for generating a MAC-e PDU by adding additional MAC-d flow data blocks in accordance with yet another embodiment.

FIG. 8A is a flow diagram of a process 800 for generating a MAC-e PDU where the smallest E-TFC size is selected from the set of supported E-TFCs that supports the amount of data allowed to be multiplexed according to the current scheduled and non-scheduled grants. MAC-d flow data blocks are multiplexed into a MAC-e PDU in accordance with an absolute priority until the maximum amount of data allowed by current scheduled and non-scheduled grants is reached 802. The smallest possible E-TFC is selected from a set of supported E-TFCs that is larger than the size of the multiplexed MAC-e PDU 804. If the selected E-TFC size exceeds the size of the multiplexed MAC-d flow data blocks and the MAC-e header by more than the smallest MAC-d flow multiplexing block size, add one or more additional MAC-d flow data blocks in accordance with the absolute priority until no further MAC-d flow data blocks and associated MAC-e header information can fit within the selected E-TFC size.

Figure 8B:
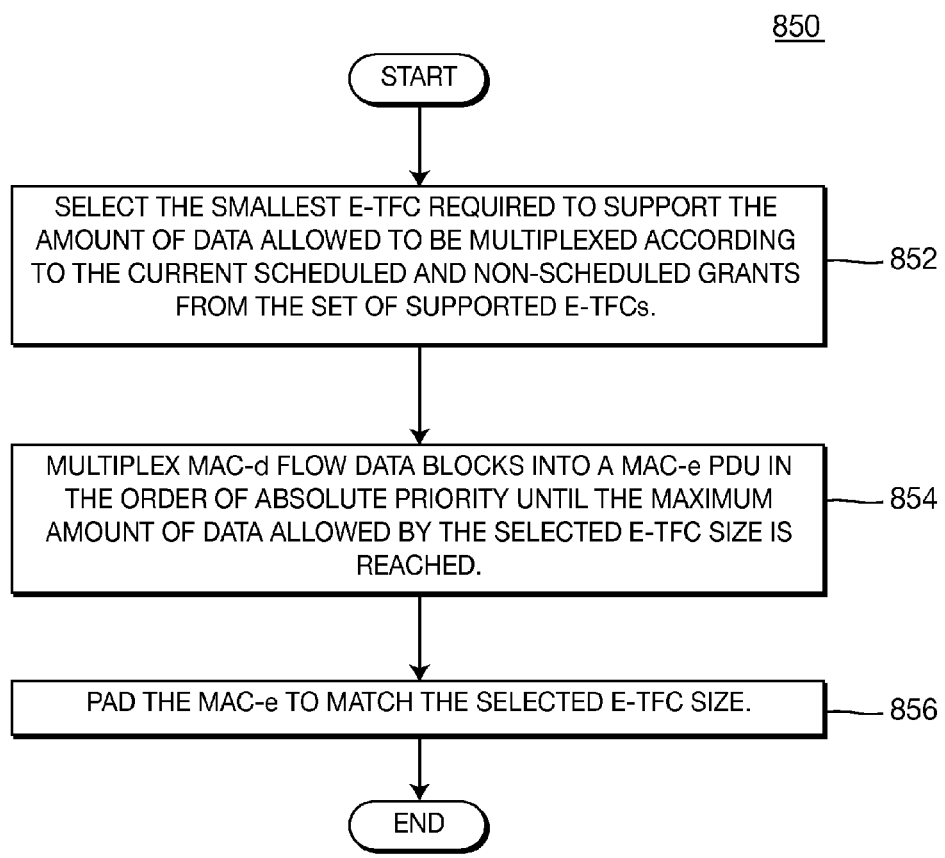
FIG. 8B is a flow diagram of a process for generating a MAC-e PDU by adding additional MAC-d flow data blocks in accordance with an alternative to the process of FIG. 8A.

In an alternative process 850 shown in FIG. 8B, the smallest E-TFC that supports the amount of data allowed to be multiplexed according to the current scheduled and non-scheduled grants is selected from the set of supported E-TFCs 852. MAC-d flow data blocks are then multiplexed into a MAC-e PDU in the order of absolute priority until the maximum amount of data allowed by the selected E-TFC size is reached 854. Preferably only the amount of scheduled data allowed by the grant is adjusted to more closely match the selected E-TFC. Non-scheduled MAC-d flow data that is multiplexed may be restricted to the non-scheduled grant. Padding is then applied to match the selected E-TFC size 856. With this scheme, data can be transmitted exceeding the scheduled and/or non-scheduled grants.

Figure 9:
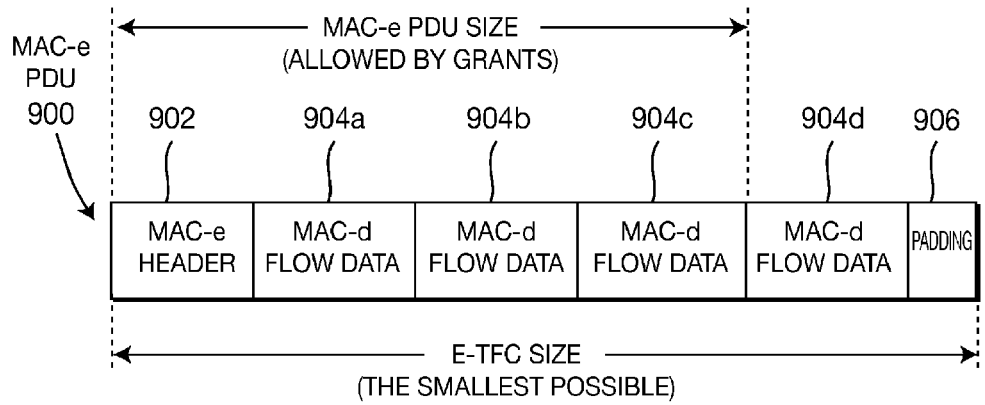
FIG. 9 illustrates MAC-e PDU generation using the processes of FIGS. 8A and 8B.

FIG. 9 illustrates an increased size MAC-e PDU 900 that fully utilizes a selected E-TFC size that supports the current grants. A MAC-e PDU header 902 and MAC-d flow data blocks 904a-904c are supported by the current scheduled and non-scheduled grants. Referring to FIGS. 8A, 8B and 9, the MAC-d flow data blocks 904a-904c are multiplexed into a MAC-e PDU in accordance with an absolute priority until the maximum amount of data allowed by the current scheduled and non-scheduled grants is reached. As shown in FIG. 9, three (3) MAC-d flow data blocks 904a-904c are multiplexed as an example, and any number of MAC-d flow data blocks may be multiplexed. The smallest possible E-TFC is selected from a set of supported E-TFCs that is larger than the size of the multiplexed MAC-e PDU. If the selected E-TFC size exceeds the size of the multiplexed MAC-d flow data blocks 904a-904c and the MAC-e header 902 by more than the smallest MAC-d flow multiplexing block size, one or more additional MAC-d flow data blocks 904d are added as shown in FIG. 9 in accordance with the absolute priority until no further MAC-d flow data blocks and associated MAC-e header information can fit within the selected E-TFC size. Preferably, only scheduled MAC-d flow data is added exceeding the current grant, but non-scheduled MAC-d flow data may also be added. Padding 906 is then applied to match the selected E-TFC size. With this scheme, MAC-d flow multiplexing is optimized to take advantage of unused data bits that would have been filled with padding bits.

Figure 10B:
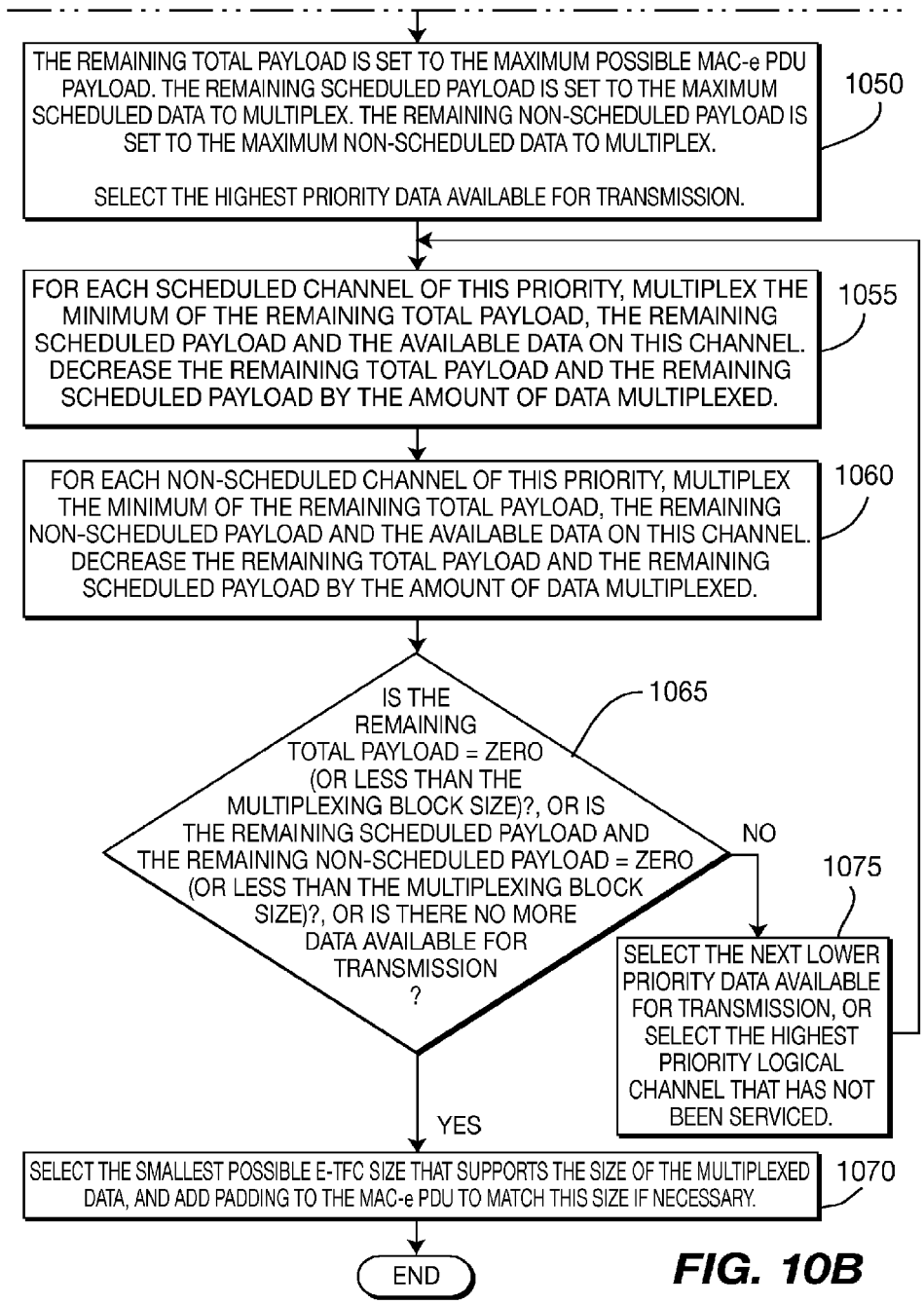

FIGS. 10A and 10B, taken together, is a flow diagram of a procedure 1000 for multiplexing whereby, in advance of MAC-e PDU multiplexing, the amount of data to multiplex according to the scheduled and/or non-scheduled grants is adjusted to more closely match the next larger or next smaller E-TFC size relative to the amount of data allowed to be multiplexed by the scheduled and/or non-scheduled grants. FIG. 10A identifies a method where only the amount of scheduled data to multiplex is adjusted to more closely match the selected E-TFC.

Referring to FIG. 10A, an E-TFC restriction procedure is performed (step 1005) to determine the set of supported E-TFCs including the largest possible E-TFC size (step 1010) by considering MAC-d flow power offset of the highest priority data available for transmission.

Still referring to FIG. 10A, if the largest possible E-TFC size resulting from E-TFC restriction, (considering remaining power and the highest priority MAC-d flow power offset), is determined in step 1015 to be less than the amount of data allowed by the scheduled and non-scheduled grants (remaining power limited case), the maximum possible payload for MAC-e PDU multiplexing is set to the largest possible E-TFC size (step 1020) whereby the maximum amount of scheduled data to multiplex is set to the amount of data specified by the scheduled grant (step 1025) and the maximum amount of non-scheduled data to multiplex is set to the amount of data specified by the non-scheduled grant (step 1030).

Still referring to FIG. 10A, if the largest possible E-TFC size resulting from E-TFC restriction is determined in step 1015 to be greater than the amount of data allowed by the scheduled and non-scheduled grants (the grant limited case), the maximum amount of scheduled data to multiplex is adjusted to match either the next larger or next smaller E-TFC size relative to the amount of available data allowed by the scheduled and non-scheduled grants (steps 1040, 1045).

For example, rather than setting the maximum amount of scheduled data to multiplex to the amount of data allowed by the scheduled grant, the maximum amount of scheduled data is set to the selected E-TFC size minus the amount of available data allowed to be transmitted by the non-scheduled grants (step 1040), and the maximum amount of non-scheduled data to multiplex is set to the non-scheduled grant (step 1045) for each non-scheduled data flow. These methods, or other similar methods, result in setting the amount of multiplexed scheduled and non-scheduled data to match the selected E-TFC size, rather than setting the amount of multiplexed scheduled and non-scheduled data according to the associated grants.

Preferably, only the amount of data allowed to be multiplexed from scheduled MAC-d flows is increased or decreased to more closely match the selected E-TFC size. Optionally, the maximum possible payload for MAC-e PDU multiplexing is set to the size of the selected E-TFC. Other sequences of operation to pre-determine the optimal amount of multiplexed scheduled and/or non-scheduled data in advance of multiplexing are also possible.

Referring to FIG. 10B, MAC-d flows are then multiplexed in order of priority into the MAC-e PDU until the largest supported E-TFC size, the amount of data allowed by the scheduled and non-scheduled grants is reached, or all data available for transmission on the MAC-d flow is multiplexed. In step 1050, the remaining total payload is set to the maximum possible MAC-e PDU payload, the remaining scheduled payload is set to the maximum scheduled data to multiplex, and the remaining non-scheduled payload is set to the maximum non-scheduled data to multiplex.

The "remaining total payload" is the maximum possible payload resulting from E-TFC restriction, (i.e., the largest supported E-TFC). But it is important to note that this parameter is reduced for each multiplexed data block within the multiplexing loop in step 1060. When in the maximum E-TFC limited case, this parameter will cause the exit from the multiplexing loop in step 1065. The "remaining scheduled payload" and the "remaining non-scheduled payload" are the remaining scheduled and non-scheduled data that are initially set to the maximum allowed to multiplex for that type of data. Then these parameters are reduced each time data of that type is multiplexed. They will also cause an exit from the multiplexing loop in step 1065 for the grant limited case. The highest priority data available is selected for transmission.

In step 1055, for each scheduled channel of this priority, the minimum of the remaining total payload, the remaining scheduled payload and the available data on this channel is multiplexed. The remaining total payload and the remaining scheduled payload is decreased by the amount of the data multiplexed. In step 1060, for each non-scheduled channel of this priority, the minimum of the remaining total payload, the remaining non-scheduled payload and the available data on this channel is multiplexed. The remaining total payload and the remaining scheduled payload is decreased by the amount of the data multiplexed.

If it is determined in step 1065 that the remaining total payload is zero, or the remaining scheduled payload and the remaining non-scheduled payload is zero, or there is no more data available for transmission, the smallest possible E-TFC size that supports the size of the multiplexed data is selected, and padding is added to the MAC-e PDU to match this size if necessary (step 1070). Otherwise, the next lower priority data available for transmission is selected in step 1075. It should be noted that rather than selecting the next lower priority in step 1075, it is also possible just to select the highest priority logical channel that has not been serviced, and continue the multiplexing loop until all logical channels are serviced.

Figure 11B:
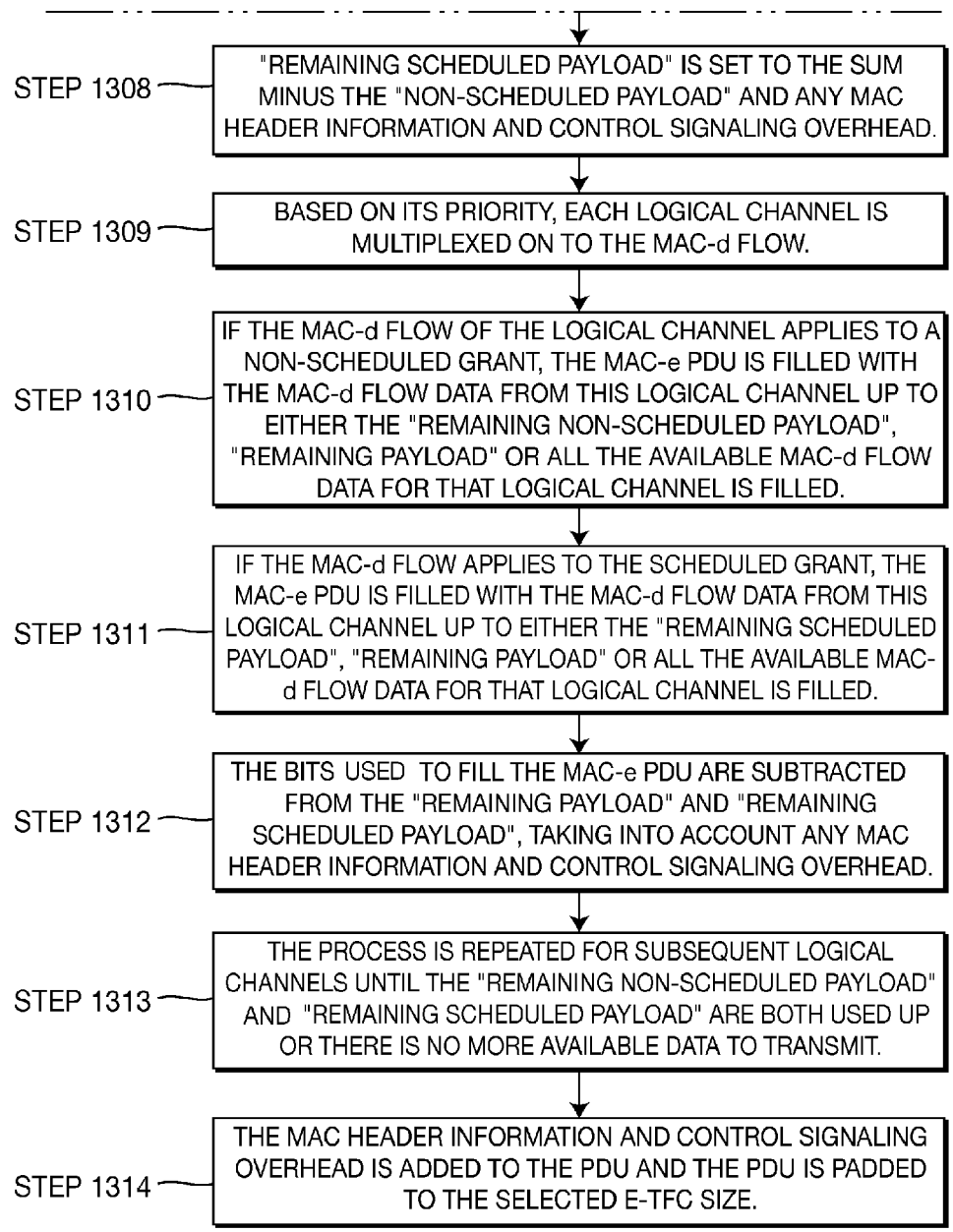

In another embodiment as illustrated in FIGS. 11A and 11B taken together, a power offset of the selected MAC-d flow is identified, step 1301. Using the power offset, a maximum supported payload, such as the largest supported E-TFC that can be sent by the WTRU based on the offset and the remaining power allowed for E-DCH data is identified. This can be referred to as the E-TFC restriction procedure, step 1302. A variable, "Remaining Payload", is initially set to the maximum supported payload, step 1303. Based on the scheduled grant, a variable, "Remaining Scheduled Payload", is set to the largest payload that can be transmitted according to the scheduled grant and the power offset, step 1304. For each MAC-d flow with a non-scheduled grant, a variable, "Remaining Non-scheduled Payload", is set to the value of the grant, step 1305. A variable, "Non-scheduled Payload", is the amount of non-scheduled data that can be transmitted and is based on a sum of non-serving grants and the available data on each of these non-scheduled MAC-d flows, step 1306.

If the "Remaining Payload" is larger than the sum of the amount of available data allowed to be transmitted by the "Remaining Scheduled Payload", "Remaining Non-scheduled Payload" including any MAC header information and control signaling overhead, the next smaller supported E-TFC is selected based on the sum, step 1307. If the "Remaining Payload" is not larger than the sum, the largest supported E-TFC is used to limit the amount of multiplexed data. In the case that there is no "Scheduled Payload", the selected E-TFC will be the largest supported E-TFC, as the "Remaining Payload" will not be larger than the sum. This allows for the transfer of all "Non-Scheduled" payload unless the E-TFC is restricted to not permit this transfer.

The next smaller supported E-TFC is the largest supported E-TFC that does not carry more data than the sum. In other words, the selected E-TFC is the next smaller E-TFC based on the serving grant, non-scheduled grants, the power offset, available data, including any MAC header information and control signaling overhead, such as scheduling information. The "Remaining Scheduled Payload" is set to the size of the selected E-TFC, which can also be referred to as a "quantized sum", minus the "Non-scheduled Payload" and any MAC header information and control signaling overhead, step 1308. By setting the "Remaining Scheduled Payload" this way, only the scheduled data is quantized. The "Non-scheduled Payload" is reserved within the selected E-TFC according to the non-scheduled grants. Based on its priority, each logical channel and their associated MAC-d flow is multiplexed on to the MAC-e/es PDU, step 1309.

If the MAC-d flow of the logical channel applies to a non-scheduled grant, the MAC-e/es PDU is filled with the MAC-d flow data from this logical channel up to the minimum of "Remaining Non-scheduled Payload", "Remaining Payload" or the available MAC-d flow data for that logical channel is filled, step 1310. The bits used to fill the MAC-e/es PDU are subtracted from the "Remaining Payload" and the "Remaining Non-scheduled Payload", taking into account any MAC header information and control signaling overhead. If the MAC-d flow applies to a scheduled grant, the MAC-e/es PDU is filled with the MAC-d flow data from this logical channel up to the minimum of "Remaining Scheduled Payload", "Remaining Payload" or the available MAC-d flow data for that logical channel is filled, step 1311. The bits used to fill the MAC-e/es PDU are subtracted from the "Remaining Payload" and "Remaining Scheduled Payload", taking into account any MAC header information and control signaling overhead, step 1312. The process is repeated for all logical channels, or until the "Remaining Non-scheduled Payload" and "Remaining Scheduled Payload" are both used up, or "Remaining Payload" is used up, or there is no more available data to transmit step 1313. The MAC control signaling overhead such as scheduling information is added to the PDU and the PDU is padded to the selected E-TFC size, step 1314.

This procedure allows the UE operation to be "deterministic" and the Node-B scheduler can therefore accurately predict how resource grants will be used by the WTRU. As a result, the Node-B can more efficiently allocate resources. It is desirable to have the amount of multiplexed data adjusted (quantized) so that: first, physical resources are more efficiently utilized and second increased data rates are achieved. In order to accomplish this, it is necessary in the grant limited case that the E-TFC is selected based on the current grants, and this payload size is used to quantize the amount of scheduled data allowed by the grant before multiplexing of the MAC-e/es PDU. Better physical resource utilization and increased data rates are achieved by effecting the E-TFC selection and the multiplexing algorithm.

Figure 12:
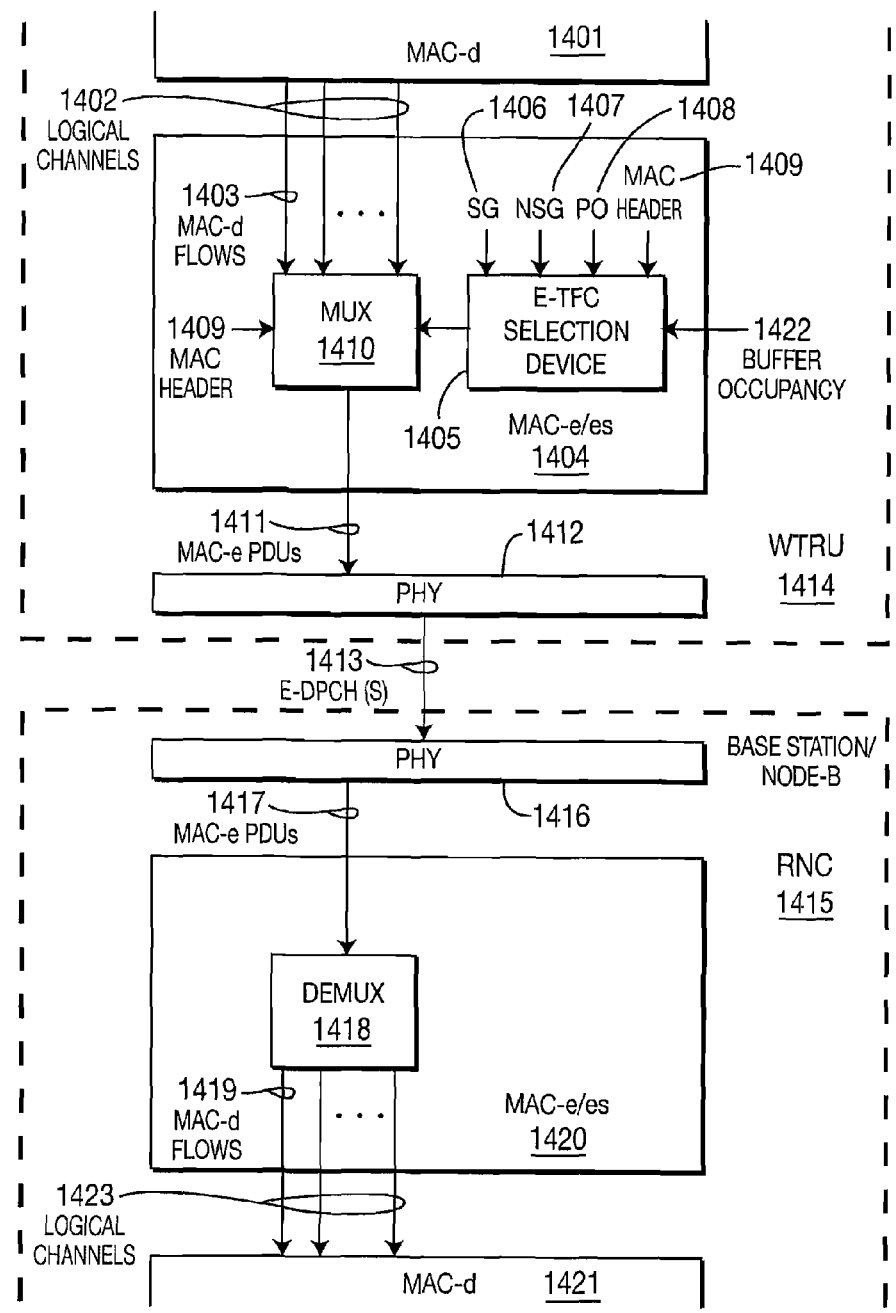
FIG. 12 is a block diagram illustrating a simplified architecture for EU multiplexing.

FIG. 12 is a block diagram illustrating a simplified architecture for EU multiplexing. At the WTRU 1414, MAC-d flows 1403 for various logical channels 1402 are provided to the MAC-e/es 1404 by the MAC-d 1401. An E-TFC selection device 1405 selects an E-TFC for EU transmissions, such as on an enhanced dedicated channel (E-DCH) TTI basis. The E-TFC selection device 1405 receives inputs, such as scheduled grants (SG) 1406, non-scheduled grants (NSG) 1407, power offsets (PO) 1408, MAC header information and control signaling overhead (MAC HEADER) 1409, buffer occupancy 1422 of MAC-d flows mapped to the E-DCH, and supported E-TFCs (or remaining E-DCH power to perform the E-TFC restriction procedure). Also, "Grant Quantization" that adjusts the maximum amount of multiplexed data allowed by the resource grants can occur between E-TFC selection 1405 and the multiplexer (MUX) 1410. A multiplexer (MUX) 1410 multiplexes the MAC-d flows 1403 for transmission according to the grants that have been quantized to more closely match the selected E-TFC. The MUX 1410 multiplexes the MAC-d flows 1403, adds header information 1409, and adds padding, if needed, to match the selected E-TFC size. The MAC-e PDUs 1411 produced by the MUX 1410, the selected E-TFC, and power offset are provided to a physical layer device (PHY) 1412 for transmission over the enhanced dedicated physical channel(s) (E-DPCH(s)) 1413 using the selected E-TFC.

At the base station/Node-B and Radio Network Controller (RNC) 1415, the E-DPCH(s) 1413 are received and processed by a PHY 1416 of the base station/Node-B 1415. The MAC-e PDUs 1417 as produced by the PHY 1416 are demultiplexed into the constituent MAC-d flows 1419 and logical channels 1423 by a demultiplexer (DEMUX) 1418 of the MAC-e/es 1420. The MAC-d flows 1419 are delivered to the MAC-d 1421.

Figure 13B:
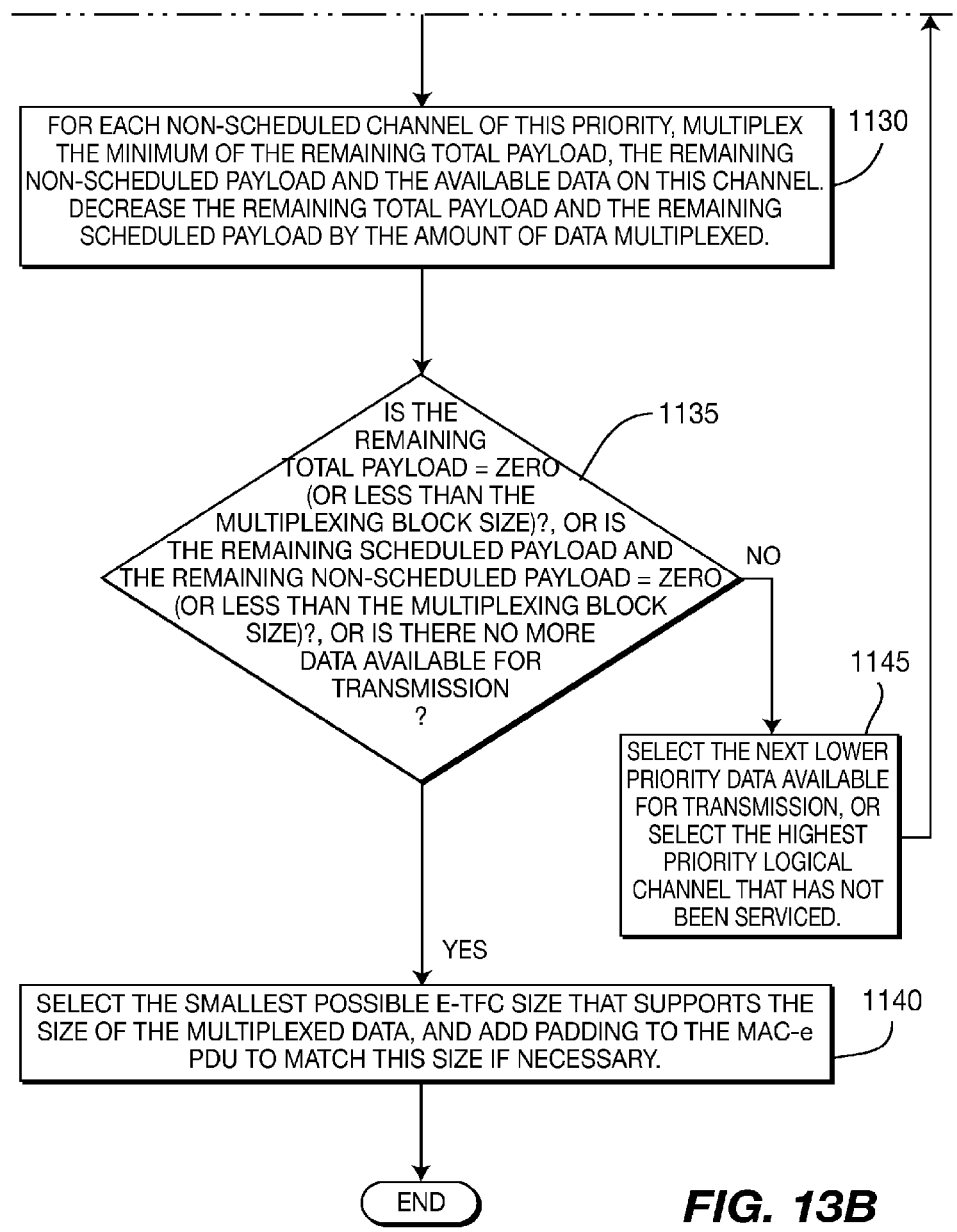

FIGS. 13A and 13B, taken together, is a flow diagram of a multiplexing procedure 1100 in which the amount of multiplexed scheduled and/or non-scheduled data is adjusted to more closely match the next higher or next lower E-TFC size while performing data multiplexing. Within the order of priority multiplexing loop shown in FIG. 10B, if the amount of data to multiplex is limited by the grant, the amount of data to multiplex is adjusted according to the next larger or smaller E-TFC size according the amount of data allowed to be multiplexed by the sum of the grants.

Referring to FIG. 13A, in step 1105, the remaining total payload is set to the maximum possible MAC-e PDU payload, the remaining scheduled payload is set to the maximum scheduled data to multiplex, and the remaining non-scheduled payload is set to the maximum non-scheduled data to multiplex.

If the remaining scheduled payload is less than or equal to the remaining total payload, as determined in step 1110 and, optionally, the remaining non-scheduled payload and non-scheduled data is greater than zero (step 1115), the next smaller or larger E-TFC size is selected relative to the amount of data already multiplexed (including MAC header overhead) plus the remaining scheduled payload (step 1120). The remaining scheduled payload is equal to the selected E-TFC size minus the amount of data already multiplexed (including MAC header overhead).

In step 1125, for each scheduled channel of this priority, the minimum of the remaining total payload, the remaining scheduled payload and the available data on this channel is multiplexed. The remaining total payload and the remaining scheduled payload is decreased by the amount of the data multiplexed.

Referring to FIG. 13B, in step 1130, for each non-scheduled channel of this priority, the minimum of the remaining total payload, the remaining non-scheduled payload and the available data on this channel is multiplexed. The remaining total payload and the remaining scheduled payload is decreased by the amount of the data multiplexed.

If it is determined in step 1135 that the remaining total payload is zero, or the remaining scheduled payload and the remaining non-scheduled payload is zero, or there is no more data available for transmission, the smallest possible E-TFC size that supports the size of the multiplexed data is selected, and padding is added to the MAC-e PDU to match this size if necessary (step 1140). Otherwise, the next lower priority data available for transmission is selected in step 1145. It should be noted that rather than selecting the next lower priority in step 1145, it is also possible just to select the highest priority logical channel that has not been serviced.

Figure 14:
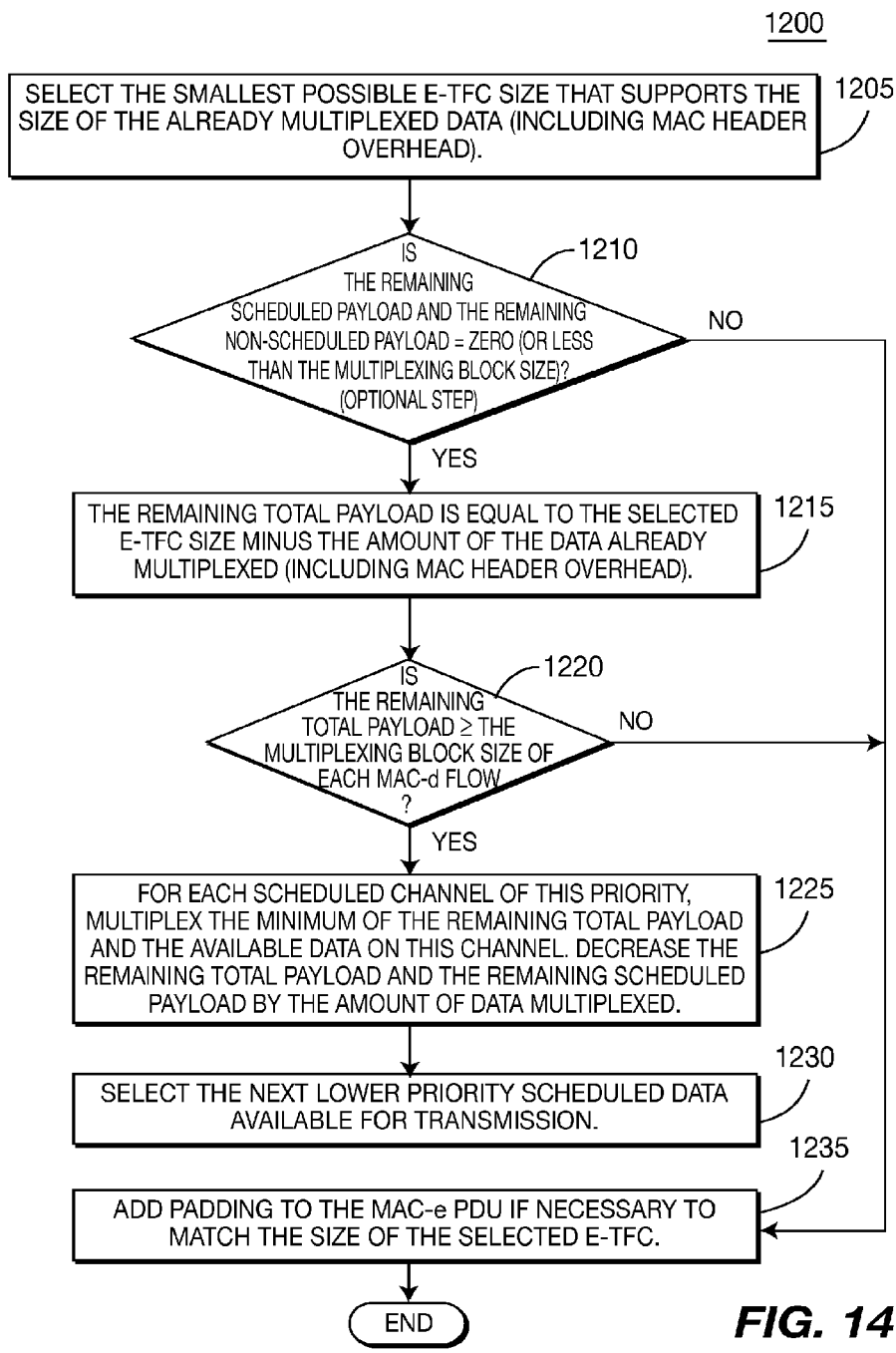
FIG. 14 is a flow diagram of an exemplary multiplexing procedure in accordance with another embodiment.

FIG. 14 is a flow diagram of a multiplexing procedure 1200 in accordance with another embodiment. In the grant limited case, MAC-d flow data is multiplexed into a MAC-e PDU until the amount of data allowed to be multiplexed by the scheduled or non-scheduled grant associated with each MAC-d flow is reached.

Before padding the MAC-e PDU to match the selected E-TFC size, more MAC-d flow data is multiplexed if the multiplexing block size, (the MAC-d PDU size), is less than the amount of padding required to match the next larger E-TFC size relative to the amount of data allowed by the scheduled and non-scheduled grants. Preferably for the additional multiplexing, only scheduled data of the highest priority that is available for transmission is used, and non-scheduled multiplexed data remains limited by the non-scheduled grants.

Alternatively, multiplexed data is reduced to support the next lower E-TFC size relative to the amount of data allowed by the scheduled and non-scheduled grants, if the multiplexing block size, (the MAC-d PDU size), is less than the amount of needed padding to the next higher E-TFC size. Optionally padding thresholds other than the multiplexing block size for reducing the E-TFC size can also be considered, or the required padding to match the next lower E-TFC size being less than the larger E-TFC by some margin could be used as a criteria for reducing the E-TFC size.

References to the amount of data multiplexed according to grants, and the amount of data that can be multiplexed according to a selected E-TFC takes into account MAC header information and other control signaling overhead required in the formatting of a MAC-e PDU.

Referring to FIG. 14, the smallest possible E-TFC size is selected that supports the size of the already multiplexed data (including MAC header overhead) (step 1205). If the remaining scheduled payload and the remaining non-scheduled payload is equal to zero (optional step 1210), the remaining total payload is equal to the selected E-TFC size minus the amount of the data already multiplexed (including MAC header overhead) (step 1215).

If the remaining total payload is greater than or equal to the multiplexing block size of each MAC-d flow, as determined in step 1220, for each scheduled channel of this priority, the minimum of the remaining total payload and the available data on this channel is multiplexed, and the remaining total payload and the remaining scheduled payload is decreased by the amount of data multiplexed (step 1225). In step 1230, the next lower priority scheduled data available for transmission is selected. In step 1235, padding is added to the MAC-e PDU if necessary to match the size of the selected E-TFC.

Any combination of the above embodiments may also be applied to achieve improved multiplexing efficiency and radio resource utilization.

Although the features and elements of the present invention are described in the preferred embodiments in particular combinations, each feature or element can be used alone without the other features and elements of the preferred embodiments or in various combinations with or without other features and elements of the present invention.

What is claimed is:

1. A method for multiplexing data implemented by a wireless transmit/receive unit (WTRU), the method comprising:

receiving a serving grant, wherein the serving grant is a grant for scheduled data transmission;

receiving at least one non-scheduled grant, wherein the non-scheduled grant is a grant for non-scheduled data transmission;

determining an available payload amount for a medium access control for enhanced uplink (MAC-e) protocol data unit (PDU), wherein the available payload amount is the smaller of: a maximum supported payload amount and a first amount of data, wherein the first amount of data is based on the serving grant and the at least one non-scheduled grant; and multiplexing bits from a medium access control for dedicated channel (MAC-d) flow into the MAC-e PDU;

wherein the multiplexing is based on logical channel priority, wherein a higher priority logical channel is selected before a lower priority logical channel;

wherein on a condition that the selected logical channel is associated with a non-scheduled MAC-d flow, the MAC-e PDU is filled with bits from the non-scheduled MAC-d flow up to the smaller of: an amount of data allowed by the non-scheduled grant for the non-scheduled MAC-d flow, an amount of data available for the selected logical channel, and the available payload amount; and wherein on a condition that the selected logical channel is associated with a scheduled MAC-d flow, the MAC-e PDU is filled with bits from the scheduled MAC-d flow up to the smaller of: an amount of data allowed by the serving grant, an amount of data available for the selected logical channel, and the available payload amount reduced by a quantization amount.

2. The method of claim 1, wherein the maximum supported payload amount is based on supported enhanced dedicated channel transport format combinations (E-TFCs) and a power offset associated with a MAC-d flow, wherein the MAC-d flow is associated with a highest priority.

3. The method of claim 1, wherein the first amount of data is determined by summing an amount of data allowed to be transmitted based on the serving grant and an amount of data allowed to be transmitted based on the at least one non-scheduled grant.

4. The method of claim 1, wherein on a condition that the available payload amount is equal to a supported enhanced dedicated channel transport format combination (E-TFC) size, the quantization amount is zero.

5. The method of claim 1, wherein on a condition that the available payload amount is not equal to a supported enhanced dedicated channel transport format combination (E-TFC) size, the quantization amount is an amount based on a next smaller E-TFC size relative to the available payload amount.

6. The method of claim 1 further comprising:

selecting an enhanced dedicated channel transport format combination (E-TFC) for transmission of the MAC-e PDU, wherein the selected E-TFC is a smallest E-TFC that supports the MAC-e PDU size; and transmitting the MAC-e PDU using the selected E-TFC.

7. The method of claim 1, wherein the serving grant originates from a Node-B and the at least one non-scheduled grant originates from a radio network controller (RNC).

8. A wireless transmit/receive unit (WTRU) comprising:

at least one circuit configured to receive a serving grant, wherein the serving grant is a grant for scheduled data transmission;

the at least one circuit configured to receive at least one non-scheduled grant, wherein the non-scheduled grant is a grant for non-scheduled data transmission;

the at least one circuit configured to determine an available payload amount for a medium access control for enhanced uplink (MAC-e) protocol data unit (PDU), wherein the available payload amount is the smaller of: a maximum supported payload amount and a first amount of data, wherein the first amount of data is based on the serving grant and the at least one non-scheduled grant; and the at least one circuit configured to multiplex bits from a medium access control for dedicated channel (MAC-d) flow into the MAC-e PDU;

wherein the multiplexed bits are based on logical channel priority, wherein a higher priority logical channel is selected before a lower priority logical channel;

wherein on a condition that the selected logical channel is associated with a non-scheduled MAC-d flow, the MAC-e PDU is filled with bits from the non-scheduled MAC-d flow up to the smaller of: an amount of data allowed by the non-scheduled grant for the non-scheduled MAC-d flow, an amount of data available for the selected logical channel, and the available payload amount; and wherein on a condition that the selected logical channel is associated with a scheduled MAC-d flow, the MAC-e PDU is filled with bits from the scheduled MAC-d flow up to the smaller of: an amount of data allowed by the serving grant, an amount of data available for the selected logical channel, and the available payload amount reduced by a quantization amount.

9. The WTRU of claim 8, wherein the maximum supported payload amount is based on supported enhanced dedicated channel transport format combinations (E-TFCs) and a power offset associated with a MAC-d flow, wherein the MAC-d flow is associated with a highest priority.

10. The WTRU of claim 8, wherein the first amount of data is determined by summing an amount of data allowed to be transmitted based on the serving grant and an amount of data allowed to be transmitted based on the at least one non-scheduled grant.

11. The WTRU of claim 8, wherein on a condition that the available payload amount is equal to a supported enhanced dedicated channel transport format combination (E-TFC) size, the quantization amount is zero.

12. The WTRU of claim 8, wherein on a condition that the available payload amount is not equal to a supported enhanced dedicated channel transport format combination (E-TFC) size, the quantization amount is an amount based on a next smaller E-TFC size relative to the available payload amount.

13. The WTRU of claim 8 further comprising:
the at least one circuit configured to select an enhanced dedicated channel transport format combination (E-TFC) for transmission of the MAC-e PDU, wherein the selected E-TFC is a smallest E-TFC that supports the MAC-e PDU size; and
the at least one circuit configured to transmit the MAC-e PDU using the selected E-TFC.

14. The WTRU of claim 8, wherein the serving grant originates from a Node-B and the at least one non-scheduled grant originates from a radio network controller (RNC).

* * * * *